US012470132B2

United States Patent
Shah et al.

(10) Patent No.: US 12,470,132 B2
(45) Date of Patent: Nov. 11, 2025

(54) PARALLEL-CONNECTED RESONANT CONVERTER CIRCUITS

(71) Applicant: North Carolina State University, Raleigh, NC (US)

(72) Inventors: Suyash Sushilkumar Shah, Raleigh, NC (US); Subhashish Bhattacharya, Raleigh, NC (US); Sagar Kumar Rastogi, Raleigh, NC (US)

(73) Assignee: NORTH CAROLINA STATE UNIVERSITY, Raleigh, NC (US)

( * ) Notice: Subject to any disclaimer, the term of this patent is extended or adjusted under 35 U.S.C. 154(b) by 143 days.

(21) Appl. No.: 17/992,476

(22) Filed: Nov. 22, 2022

(65) Prior Publication Data

US 2023/0163682 A1 May 25, 2023

Related U.S. Application Data

(60) Provisional application No. 63/282,172, filed on Nov. 22, 2021.

(51) Int. Cl.
*H02M 3/335* (2006.01)
*H02M 1/00* (2006.01)
(Continued)

(52) U.S. Cl.
CPC .......... *H02M 3/01* (2021.05); *H02M 1/0009* (2021.05); *H02M 3/158* (2013.01);
(Continued)

(58) Field of Classification Search
CPC .................. H02M 3/01; H02M 3/285
See application file for complete search history.

(56) References Cited

U.S. PATENT DOCUMENTS 6,886,030 B1 * 4/2005 Easterbrook .......... H04L 51/224
 709/206
8,842,448 B2 9/2014 Ye et al.
(Continued)

FOREIGN PATENT DOCUMENTS

EP 2600512 B1 9/2015

OTHER PUBLICATIONS

What is a Voltage-to-Frequency Converter? Types, Operating Principle, Applications, YIC International Co., Limited.*
(Continued)

*Primary Examiner* — Alex Torres-Rivera
(74) *Attorney, Agent, or Firm* — Thomas | Horstemeyer, LLP

(57) ABSTRACT

Various examples are provided related to parallel-connected resonant converters and their operation. In one example, a system includes a plurality of resonant converters connected in parallel and an output voltage regulator that can generate a common control reference signal provided to each of the plurality of resonant converters. The common control reference signal can be based upon a signal from a single output voltage sensor, where operation of the resonant converters is controlled in response to the common control reference signal. In another example, a method includes monitoring an output voltage of a plurality of resonant converters connected in parallel using a single output voltage sensor; generating a common control reference signal using a signal from the single output voltage sensor; and providing the common control reference signal to each of the resonant converters, where operation of the resonant converters is controlled in response to the common control reference signal.

12 Claims, 20 Drawing Sheets

(51) Int. Cl.
*H02M 3/00* (2006.01)
*H02M 3/158* (2006.01)
*H02M 3/28* (2006.01)

(52) U.S. Cl.
CPC ......... *H02M 3/1584* (2013.01); *H02M 3/285* (2013.01); *H02M 3/33573* (2021.05)

(56) References Cited

U.S. PATENT DOCUMENTS

| | | | | |
|---|---|---|---|---|
| 9,755,522 | B2* | 9/2017 | Dubus | H02M 3/1584 |
| 2015/0103564 | A1* | 4/2015 | Duan | H02M 3/33571 |
| | | | | 363/21.02 |
| 2019/0068071 | A1* | 2/2019 | Jia | H02M 3/3376 |
| 2019/0280521 | A1* | 9/2019 | Lundstrom | H02J 3/381 |
| 2020/0204079 | A1* | 6/2020 | Guo | H02M 3/285 |
| 2021/0226547 | A1* | 7/2021 | Kakalashvili | H02M 3/285 |
| 2022/0393574 | A1* | 12/2022 | Pervaiz | H02M 3/33592 |
| 2023/0088584 | A1* | 3/2023 | Panov | H02M 1/0019 |
| | | | | 323/271 |

OTHER PUBLICATIONS

Z. Hu, Y. F. Liu, and P. C. Sen, 'Bang-Bang Charge Control for LLC Resonant Converters', IEEE Transactions on Power Electronics, vol. 30, No. 2, pp. 1093-1108, Feb. 2015.

H. Wang, Y. Chen, and Y. F. Liu, 'A Passive-Impedance-Matching Technology to Achieve Automatic Current Sharing for a Multiphase Resonant Converter', IEEE Transactions on Power Electronics, vol. 32, No. 12, pp. 9191-9209, Dec. 2017.

H. Figge, T. Grote, N. Froehleke, J. Boecker, and P. Ide, 'Paralleling of LLC resonant converters using frequency controlled current balancing', in 2008 IEEE Power Electronics Specialists Conference, Jun. 2008, pp. 1080-1085.

* cited by examiner

TABLE I
PARAMETERS OF TWO 1000 W LLC RESONANT CONVERTERS
| Parameter | Variable | LLC-1 | LLC-2 |
|---|---|---|---|
| Input voltage | $V_{in}$ | 270 V | |
| Output voltage | $V_o$ | 56 V | |
| Turns-ratio | $n$ | 10:2 | |
| Output capacitor (ESR) | $C_f$ | 60 µF (2 mΩ) | |
| Series inductance | $L_r$ | 22.9 µH | 23.1 µH |
| Magnetising inductance | $L_m$ | 105.8 µH | 105.7 µH |
| Resonant capacitor | $C_r$ | 25.9 nF | 27.4 nF |
| Series resonant frequency | $f_0$ | 207 kHz | 200 kHz |
| Cable impedance | $Z_c$ | 10 mΩ/1200 nH | 12 mΩ/1400 nH |
FIG. 6
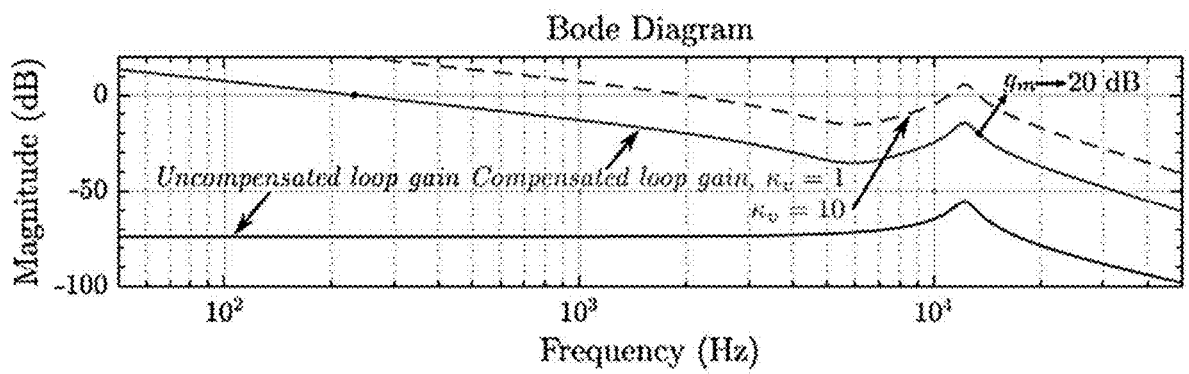
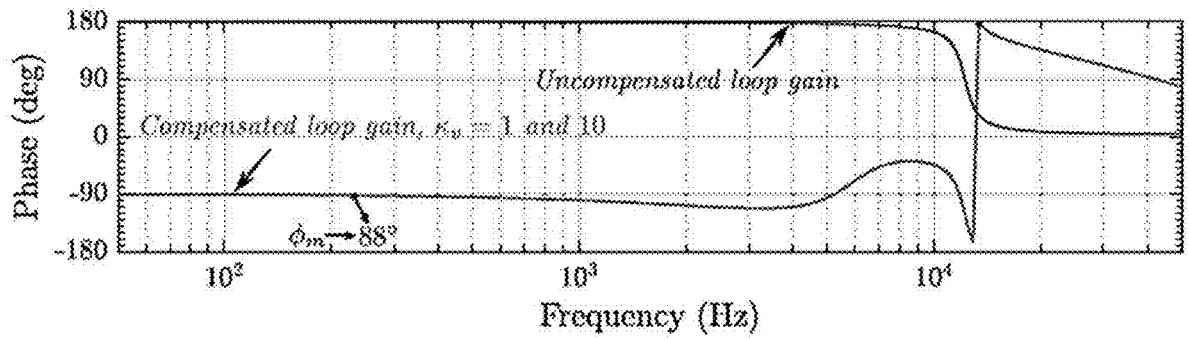
FIG. 7A

TABLE II
Steady-state CDE in Two Parallel-Connected 'Open-Loop' LLC Resonant Converters

| Control method | Input voltage | Output currents 1 | 2 | CDE (25) |
|---|---|---|---|---|
| Charge control | 270 V | 8.4 A | 8.3 A | 0.8% |
| Frequency control | 270 V | 11.9 A | 4.6 A | 44.2% |

TABLE III
Common Inner Reference Load Sharing Strategy in Parallel
Connected LLC Resonant Converters: Steady-State Performance

| Input voltage | Input current | Output voltage | Output currents 1 | 2 | CDE (25) |
|---|---|---|---|---|---|
| 270 V | 4.8 A | 56.1 V | 10.9 A | 11.2 A | 1.3% |

PARALLEL-CONNECTED RESONANT CONVERTER CIRCUITS

CROSS REFERENCE TO RELATED APPLICATIONS

This application claims priority to, and the benefit of, co-pending U.S. provisional application entitled "Parallel Resonant Converter Circuits" having Ser. No. 63/282,172, filed Nov. 22, 2021, which is hereby incorporated by reference in its entirety.

STATEMENT REGARDING FEDERALLY SPONSORED RESEARCH OR DEVELOPMENT

The present invention was made with United States Government support under Grant No. DE-EE0006521 awarded by the U.S. Department of Energy. The United States Government has certain rights in the invention.

BACKGROUND

Resonant converters are a popular kind of power electronic system that use high frequency switching to transfer power from one AC or DC port to a second AC or DC port. These converters are prevalent in many applications such as, for example:
Data-center and server power supplies;
Telecom power supplies such as those for cell towers and other telecom applications;
Automotive auxiliary power supplies;
On-board EV chargers and off-board superchargers;
Consumer electronics power supplies; and/or
DC microgrid applications in rural communities, offshore oil and gas, military installations.
The power capability of the system can be increased by connecting two or more such converters in parallel. Typical application of such parallel-connected converters requires use of several output voltage and output current sensors for accurate sharing of power between them (in forward and in reverse directions).

SUMMARY

Aspects of the present disclosure are related to parallel resonant converters and their operation. A power sharing technique is proposed that utilizes a single output voltage sensor and a single-channel, unidirectional, non-critical, low-bandwidth communication link between the parallel-connected converters in the system. The disclosed technique can eliminate all output current sensors and all-but-one output voltage sensors. The reduction of numerous failure points improve reliability, utilizing a single-channel, non-critical and unidirectional, low-bandwidth communication link.

The total number of sensors for a system of 'N' parallel-connected resonant converters can be reduced from '2N' to 'N+1'. This can assure accurate output current sharing between individual converters and accurate voltage regulation, while reducing bill-of-material cost. Moreover, the disclosed control architecture allows large component tolerances between the parallel-connected converters, eliminates a mode of instability, and reduces design and engineering time/cost. It can also allow drawing of energy from a battery power source and provides input-to-output power transfer even when the communication link between the parallel-connected converters fails, preventing system shutdown and improving reliability. The disclosed architecture may also be designed to transfer power in reverse direction (from nominal output port to nominal input port).

The architecture can comprise two or more resonant power converters with their input ports and output ports connected in parallel. Each individual converter can use either a high frequency voltage sensor on a series resonant capacitor or a high frequency current sensor on a series resonant inductor for sensing. The switching decision is made when the electrical quantity (resonant capacitor voltage or resonant inductor current) reaches a threshold ($V_{th,H}$ or $I_{th,H}$). A control architecture is provided for the parallel-connected resonant power converters where a common control reference is supplied to each specific resonant power converter.

The common control reference can be a resonant capacitor voltage threshold ($V_{th,H}$) generated using a common output voltage regulator or a resonant inductor current threshold ($I_{th,H}$) generated using a common output voltage regulator. The output voltage regulator may be designed according to nominal converter specification. The output voltage regulator can comprise, e.g., a simple proportional-integral regulator with a low pass filter for high frequency attenuation. The design of the regulator is independent of the number of resonant power converters connected in parallel. It reduces control complexity, design time, engineering time and does not need modification if one or more converters are added and/or removed from the parallel-connected resonant power converter system.

The methodology can include communicating the $V_{th,H}/I_{th,H}$ from the common output voltage regulator to each specific resonant power converter through a single-channel, unidirectional communication link. The communication link between the resonant power converters is not critical for continued operation of the system during a failure. The system can default to a value of $V_{th,H}/I_{th,H}$, which allows the system to continue its function of transferring power from the input port to the output port even when the communication link fails. In addition, the communication may be designed to be slow to reduce opportunities for interference and signal corruption; it helps in reducing cost, complexity, computation time and improving noise immunity.

Unlike systems presented in the prior art, the individual converters may be placed at any distance without affecting current sharing performance. It allows connection of any number of resonant power converters in parallel and across a larger area such as, but not limited to, in DC microgrid applications. The control architecture can be used with any parallel-connected resonant power converter system. All resonant power converters include one or more of a series inductor and/or a series capacitor. The control architecture can be implemented with analog electronics without any software component or with digital control and microcontroller. The architecture is also valid when power is transferred in the reverse direction. Such application is useful in electric vehicle (EV) applications or where two batteries are exchanging energy.

The system of parallel-connected resonant power converters and the disclosed control architecture allows transfer of higher power from, e.g., the input port to the output port. It does so while reducing the number of sensors in the system from '2N' to 'N+1'. All output current sensors and all output voltage sensors, except one, are eliminated. The control architecture is not sensitive to system parameter variation and allows acceptable output current sharing even in presence of +/−20% tolerance on system parameters. Examples of the impact of tolerance of system parameters (+/−20%) in LLC resonant converters are shown in FIG. 10. Output current sharing can be within +/−5%, respectively, for variations in inductance and capacitance $L_r$ and $C_r$. With respect to tolerance in inductance $L_m$, the output current sharing can be accurate within 2%.

Therefore, the cost of components and their manufacturing lead-time can be significantly reduced. It allows for large variation in the input-to-output voltage gain and system parameters. Moreover, the individual converters may operate at significantly different switching frequencies, depending on their parameter variation. Accurate output current sharing between resonant power converters can be achieved without triggering instability and the output voltage can be regulated accurately to the reference with the resonant power converters operating at different switching frequencies.

The output voltage can be directly and accurately regulated without depending on the input voltage. Therefore, a battery system may also be used to supply the parallel-connected resonant power converters. It provides the opportunity to charge one battery from another at preset rate of charging. The current sharing between individual resonant power converters is accurate in nominal operating conditions and steady state conditions. It is also accurate in transient conditions, including step-change in load, start-up, shutdown and short-circuit faults.

Since the communication is a low frequency electronic signal or optical bus, the individual converters can be placed at a distance without affecting current sharing performance. This is particularly useful in DC microgrid applications in rural communities, offshore oil and gas, and military installations. The communication bus is non-critical. A failure of the communication will result in the individual resonant power converters settling on a default value. The system will continue to function and transfer power from the input port to the output port with accurate output current sharing.

The system can be scaled to any number of parallel resonant power converters connected without need for redesign of the regulator or communication link, allowing scaling up the control architecture to more than two parallel-connected resonant power converters. Based on the type of communication, the newly added converter can tap the communication bus without affecting the performance of the complete system. The control architecture can eliminate a crucial mode of instability by assuring that if the nominally designed converter is stable, the complete parallel-connected resonant power converter system will also be stable. This, along with the scaling, can reduce the design, engineering, and deployment time if individual converters are to be added or removed from the system.

The power capability of the system can be increased by connecting two or more such converters in parallel. The control architecture allows such a configuration without extensive re-design and development. A simple addition of a converter on the local electrical network within the application will result in increased power transfer from input port to the output port with assured stable operation, accurate current sharing and precise voltage regulation. The system can be used with LLC resonant converters that are popular for low voltage, low power applications of consumer electronics to high voltage, high power on-board electric vehicle (EV) charging, and can also be utilized for solid-state transformers and off-board fast and ultra-fast EV chargers.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. The numeric values in the images are for the purpose of explanation and do not result in loss of generality. Moreover, in the drawings, like reference numerals designate corresponding parts throughout the several views. The disclosure is explained with full-bridge LLC resonant converter as an example. However, it is also applicable with appropriate numerical scaling factor to all resonant converters involving a series capacitance or inductance in the resonant tank, such as Series Resonant or LC, CLLC LCC tank converters, etc.

FIG. 6 is a table illustrating examples of LLC resonant converter parameters, in accordance with various embodiments of the present disclosure.

FIGS. 7A and 7B illustrate loop gains of standalone frequency-controlled and charge-controlled LLC resonant converters at an operating point of 50% load with the output voltage reduced as per the droop characteristics, in accordance with various embodiments of the present disclosure.

DETAILED DESCRIPTION

Figure 1:
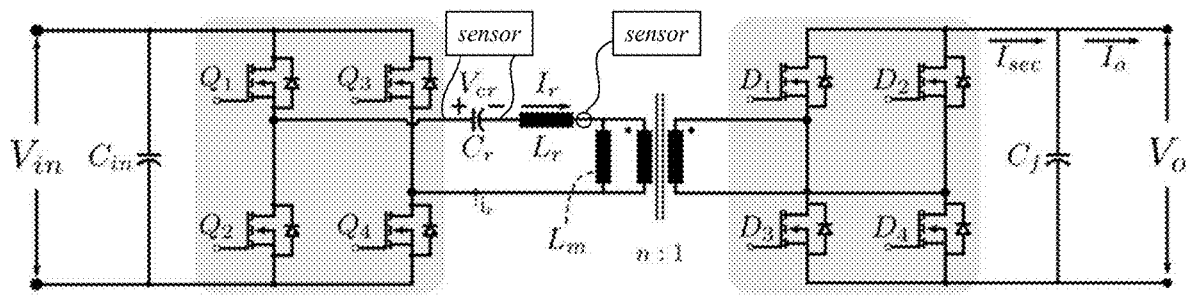
FIG. 1 illustrates an example of a circuit topology of a full-bridge LLC resonant converter, in accordance with various embodiments of the present disclosure.

Disclosed herein are examples related to parallel-connected resonant converters. The disclosure is explained with full-bridge LLC resonant converter as an example. However, it is also applicable with appropriate numerical scaling factor to all resonant converters involving a series capacitance or inductance in the resonant tank, such as Series Resonant or LC, CLLC and LCC tank converters. For example, the LLC resonant converter is a popular, variable switching frequency dc—dc converter that may be controlled using two methods: charge and frequency control. In this disclosure, the application of LLC resonant converters to input-parallel, output-parallel system is examined, however the disclosure can also be applied to other resonant converters. In this respect, models of output port I-V characteristics and small-signal output impedance of the charge-controlled LLC converter are proposed. In addition, a mathematical framework is developed for droop-based paralleled dc-dc systems. It can distinctly identify the output dc voltage and circulating current modes of stability, even in systems comprising of nonidentical converters.

The developed model and the analytical framework can be utilized to study the two modes of stability in droop-based parallel-connected LLC converters. It finds the circulating current mode instability for both the charge and frequency control methods in existing droop-based systems, despite a stable output dc bus voltage. The instability can inhibit fast response and high closed-loop bandwidth, eroding the reported advantages of the charge control method over frequency control. However, further investigation into the output port I-V characteristics reveals the superiority of charge-controlled LLC converters in paralleled systems than the conventional frequency-controlled converters—this forms the basis for the common inner reference based automatic load sharing strategy.

A novel application of common inner reference based automatic load sharing strategy is developed and uniquely applied to a charge-controlled system. In addition, the effects of component tolerance and communication delay on this strategy are also explored. The theoretical output port models and the stability analyses of parallel-connected LLC resonant converters are validated through experiments on a hardware prototype. Further, the advantage of the charge control method over frequency control in such system is illustrated. Finally, the proposed automatic load sharing strategy can be validated in steady-state and through a step-change in load. Reference will now be made in detail to the description of the embodiments as illustrated in the drawings, wherein like reference numbers indicate like parts throughout the several views.

Resonant converters are a popular class of power conversion topologies finding varied applications, such as in solid state transformers, electric vehicles, and chip-scale power supplies. FIG. 1 illustrates an example of a full-bridge LLC resonant converter having a three-element topology, comprising two inductors ($L_r$, $L_m$) and a capacitor ($C_r$) forming its resonant circuit. The resonant converter allows the voltage gain to exceed unity, while it operates at high efficiency and with reduced electromagnetic interference (EMI) due to its soft-switched characteristics. It is composed of a circuit generating a bipolar, high frequency ac square wave voltage impressed at the input of a resonant tank circuit. The circuit acts as an element of a voltage divider, the output of which is passed through a transformer and rectified. The frequency dependent characteristics of the resonant tank allow its output voltage to be regulated by changing the frequency of the ac square wave. A typical strategy is to directly control the switching frequency of the primary-side circuit. It is referred to as the frequency control method and it exhibits a double-pole resonance in all its transfer functions that need to be compensated through multiorder controllers.

Another strategy to control the output voltage is the charge control method. It was first proposed to regulate the output voltage of a boost converter by controlling the charge delivered to its output filter network. Its modern version used the switch current to control the converter. The strategy was further developed for a multiresonant converter and the LLC resonant converter. The methods compute the charge carried by the switch or the input current in one switching cycle using resettable integrators. The resonant capacitor voltage was shown to be directly proportional to the input charge drawn per cycle, and it can be used to regulate the output voltage. The method offers a first-order control-to-output transfer function and allows simple proportional-integral (PI) regulators to achieve high-bandwidth closed-loop response. In practical application, it requires an additional high-bandwidth voltage sensor and high-speed analog comparators that maintain signal fidelity in the range of operating switching frequency.

The LLC resonant converter is popular in standalone applications as well as in complex power supply systems such as those used in data-centers and automotive systems. In such systems, parallel-connected converters are also utilized to achieve the desired output current capabilities and to maintain modularity across different product platforms. This disclosure presents the capabilities of this converter in parallel-connected systems in terms of its stability margins, closed-loop bandwidth, and load sharing behavior.

The analytical study for parallel-connected systems begins with the output port model of the constituent converters. For charge-controlled LLC resonant converters, a small-signal control-to-output transfer function model of its half-bridge version can be used. In this disclosure, models of the output port I-V characteristics and the small-signal output impedance are presented. The developed models can be used to analyze the stability in droop-based parallel-connected LLC resonant converters and in other multiconverter systems.

The stability assessment techniques for paralleled systems of identical converters employing active load sharing strategies have been reported. For droop-based systems, few have discussed the small-signal stability, like the eigenvalue-based analysis for systems supplying constant power loads (CPLs). It relates to the negative incremental resistance of the CPLs and does not discriminate between the different modes of stability. In this disclosure, a mathematical framework is developed that distinctly identifies the output dc bus voltage and circulating current modes of stability in droop-based dc systems.

Using the developed analytical framework and the proposed output port models, the droop-based parallel-connected LLC resonant converter system was investigated for its two modes of stability. The study disclosed a circulating current mode instability in both frequency and charge-controlled systems, that may lead to additional losses, saturation of magnetic elements and cause protection trips or failure. The instability inhibits the closed-loop system response and diminishes the advantages of the charge control method in terms of its first order nature, high bandwidth and a simple controller structure.

Given the instability and low bandwidth along with poor voltage regulation of the droop-based parallel-connected LLC resonant converters, further investigation into the output port I-V characteristics was conducted in terms of their sensitivity to component tolerance. Based on the developed output port model, the charge-controlled LLC resonant converter was identified to be uniquely suited for a novel load sharing technique. The proposed strategy is based on the "common inner-loop current reference method" for fixed-frequency, current-mode controlled PWM dc-dc converters. However, its application to resonant converters is not obvious to the person skilled in the art and, therefore, has not yet been recognized. It uses a noncritical, single-channel communication link and enables high closed loop bandwidth while maintaining its first-order response, simple controller structure and excellent voltage regulation. The stability analyses including the effects of communication delay for the proposed strategy are presented, as well as its steady-state and dynamic load sharing performance.

The output port models of the frequency-controlled converter are reviewed, and the charge control method of LLC resonant converter is introduced. Large signal output port I-V characteristics and small-signal output impedance models of the charge-controlled converter are developed. The developed small-signal model can be used to investigate the two modes of stability in droop-based parallel-connected systems of the converter. Further, exploiting the favorable characteristics of the charge control, a load sharing strategy based on common inner reference method is proposed. Experimental results validating the output port models of the charge-controlled converter, stability analyses of droop-based parallel-connected converters and the proposed high bandwidth load sharing strategy are then discussed.

Review of Reported Models

Figure 2:
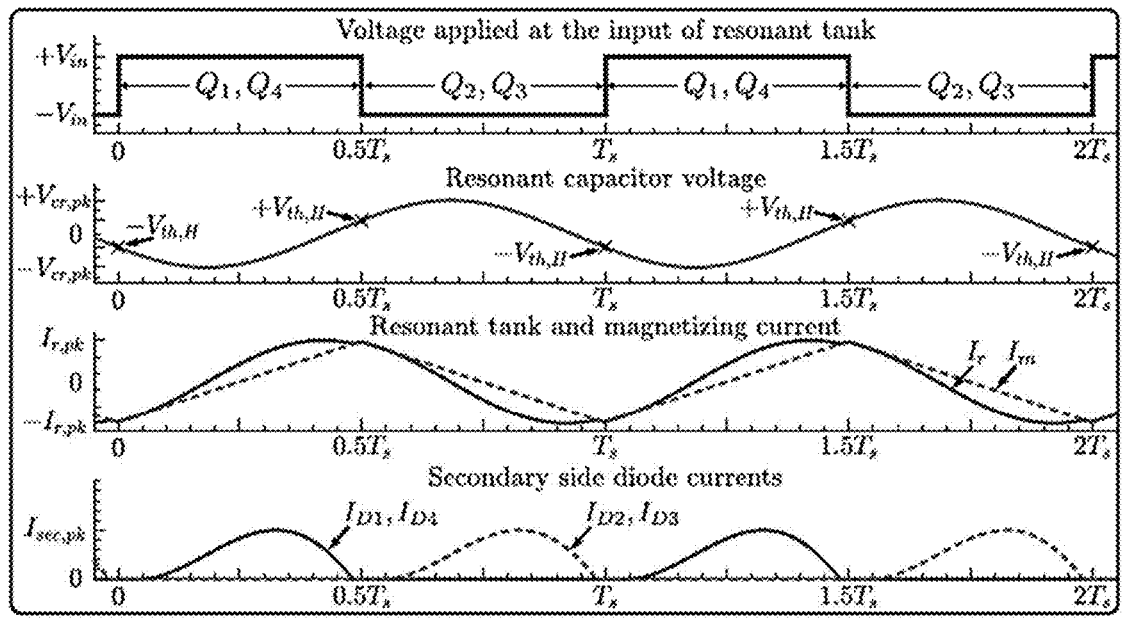
FIG. 2 illustrates examples of typical waveforms of LLC resonant converter ($\omega_s \leq \omega w_0$), where $\omega_0$ is the series resonant frequency, determined by $L_r$ and $C_r$, in accordance with various embodiments of the present disclosure.

The LLC resonant converter generates the output voltage by varying the switching frequency of its primary side circuit. The typical waveform of its resonant quantities and secondary-side diode currents along with the switching pattern for $\omega_s \leq \omega_0$, where $\omega_0$ is the series resonant frequency, are shown in FIG. 2. Using fundamental frequency approximation, its static input-to-output voltage gain can be expressed in the following equation:

$$V_o = \frac{V_{in}/n}{\sqrt{\left(1 + \gamma - \gamma(\omega_n)^{-2}\right)^2 + Q^2\left(\omega_n - \omega_n^{-1}\right)^2}} \quad (1)$$

where $$Q = \frac{\pi^2}{8} \frac{1}{n^2 R_L} \cdot \sqrt{\frac{L_r}{C_r}}; \gamma = \frac{L_r}{L_m}; \omega_n = \frac{\omega_s}{\omega_0}.$$

Figure 3:
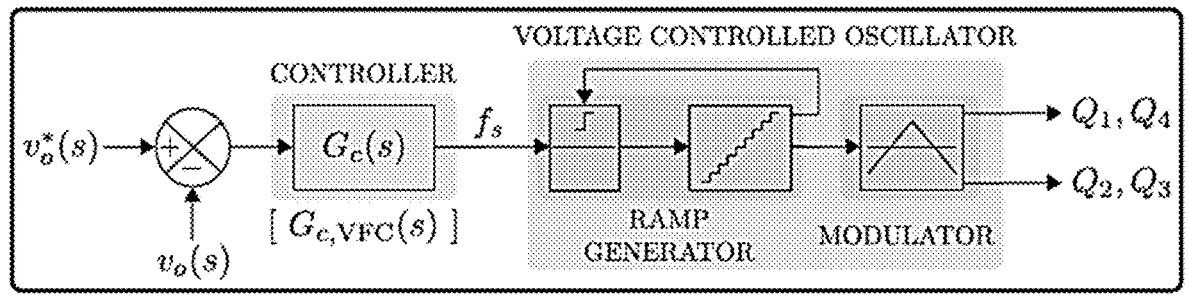
FIG. 3 is a schematic illustrating an example of a frequency control method, in accordance with various embodiments of the present disclosure.

Variable Frequency Control Method. The variable frequency control method is commonly used to control the LLC resonant converter. FIG. 3 is a schematic illustrating an example of the frequency control method. Several modeling strategies have been reported for frequency-controlled systems. In this disclosure, the output port model of the LLC resonant converter described through a unified, equivalent circuit is used. The converter is typically designed to operate close to its series resonant frequency ($\omega_0$), determined by $L_r$ and $C_r$. In this case, a double-pole resonance due to the output capacitance, $C_f$, and equivalent series inductance, $L_e$ ($\approx L_r$), is observed in all its transfer functions. Using the unified model, the control-to-output transfer function, small-signal output impedance, $Z_o(s)$, and its unterminated version, $Z_{o,un}(s)$, are derived in Eqs. (2), (3), and (4), respectively:

$$\frac{\tilde{v}_o}{\tilde{f}_s} = \frac{1}{K_d} = \frac{4n \cdot K_\omega \cdot R_L}{s^2 \cdot (L_e C_f R_L) + s \cdot L_e + \frac{8n^2}{\pi^2} R_L} \quad (2)$$

$$Z_o(s) = -\frac{\tilde{v}_o}{\tilde{i}_o} = \frac{s \cdot L_e \cdot R_L}{s^2 \cdot (L_e C_f R_L) + s \cdot L_e + \frac{8n^2}{\pi^2} R_L} \quad (3)$$

$$Z_{o,un}(s) = \lim_{R_L \to \infty} Z_o(s) = \frac{s \cdot L_e}{s^2 \cdot (L_e C_f) + \frac{8n^2}{\pi^2}}. \quad (4)$$

$K_\omega$ is associated with the independent control variable ($\tilde{\omega}_s$) in the unified equivalent circuit.

The large-signal characteristics of any frequency-controlled resonant converter are derived in [37]. Fundamental frequency approximation is assumed, resulting in the following output I-V characteristics of the LLC resonant converter:

$$\left(\frac{4}{\pi}nV_o\right)^2 + \left(\frac{\pi}{2}\frac{I_o}{n}\right)^2 \cdot \|Z_{th}(s)\|^2 = \|V_{oc}(s)\|^2 \tag{5}$$

where $$V_{oc}(s) = \frac{4}{\pi}V_{in}\frac{s^2 L_m C_r}{s^2(L_r + L_m)C_r + 1}$$

$$Z_{th}(s) = sL_m \| \left(sL_r + \frac{1}{sC_r}\right).$$

Figure 4:
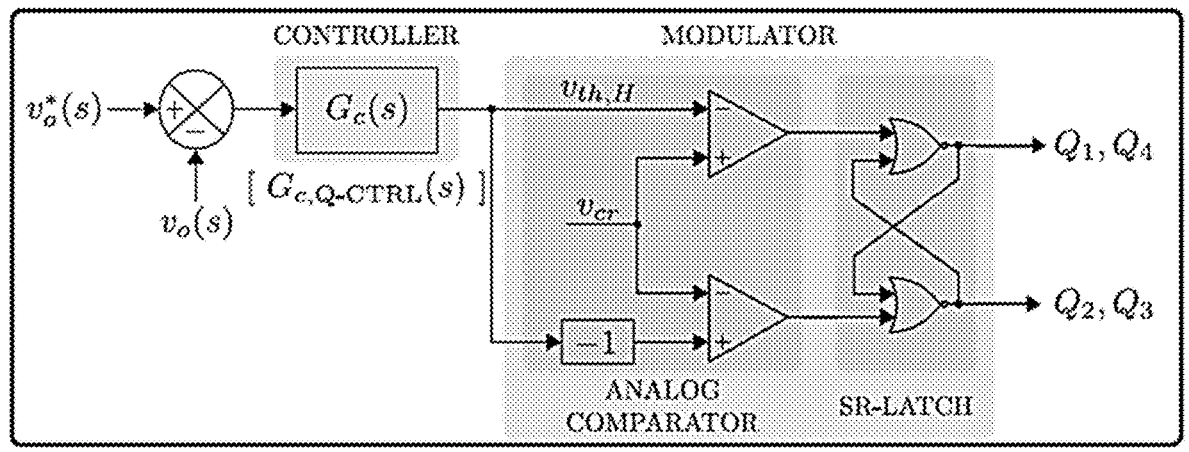
FIG. 4 is a schematic illustrating an example of a charge control method, in accordance with various embodiments of the present disclosure.

Charge Control Method. The charge control method for the half-bridge LLC resonant converter is extended to its full-bridge variant. The method is explained through its schematic in FIG. 4 and the typical waveform in FIG. 2. The primary-side circuit switches its state when the resonant capacitor voltage, $V_{cr}$, breaches a threshold voltage, $\pm V_{th,H}$, generated by the controller. Therefore, the average input current, $I_{in}$, is proportional to the total charge, $Q_r$, delivered to the resonant capacitor, $C_r$, in a switching period $$I_{in} = Q_r \cdot f_s = 4C_r V_{th,H} f_s. \tag{6}$$

The control-to-output transfer function of charge-controlled full-bridge LLC resonant converter is recounted in the following equation:

$$\frac{\tilde{v}_o}{\tilde{v}_{th,H}} = \frac{4 \cdot V_{in} \cdot C_r \cdot f_s \cdot V_o \cdot R_L}{V_o^2(1 + sC_f R_L) - 4V_{in}C_r V_{th,H} R_L(K_d V_o - f_s)}. \tag{7}$$

$V_{th,H}$ can be calculated by using the steady-state power balance at the input and output ports of the converter. The output voltage, $V_o$, is calculated in Eq. (1) and $K_d$ is derived in Eq. (2). The plant transfer function of Eq. (7) indicates a first-order system, and therefore, a simple PI regulator may be designed to achieve high closed-loop bandwidth.

Output Port Characteristics of Charge-Controlled LLC Resonant Converter

Next, the large and small signal models that describe the output-port I-V characteristics of the charge-controlled converter are proposed. These may be used to assess load sharing, stability, and control performance in multiconverter systems.

Large-Signal Output Port I-V Characteristics. The characteristic power equation of the charge-controlled LLC resonant converter is described in the following equation, if lossless power transfer is assumed:

$$P_o = V_{in}I_{in} = 4C_r V_{th,H} V_{in} f_s = V_o I_{sec} = V_o^2/R_L. \tag{8}$$

The switching frequency is a dependent function of input to output voltage gain and load quality factor, Q, Eq. (1). However, the I-V characteristics cannot be plotted if the dependent variable, $\eta_s$, remains unknown. The load quality factor, Q, is rewritten in the following equation by using Eq. (8):

$$Q = \frac{\pi^2}{8}\frac{1}{n^2 R_L} \cdot \sqrt{\frac{L_r}{C_r}} = \frac{\pi^2}{8}\frac{4V_{in}V_{th,H}}{n^2 V_o^2}\frac{f_s}{\omega_o}. \tag{9}$$

In the next step, load current is derived as a function of load voltage, $V_o$, input voltage, $V_{in}$, and control variable, $V_{th,H}$. As the load voltage varies, the voltage gain function of Eq. (1) and load factor of Eq. (9) expressions are solved for switching frequency, $f_s$. The load current is, then, expressed in the following equation by using Eq. (8):

$$I_o = I_{sec} = \frac{4C_r V_{th,H} V_{in}}{V_o} \cdot f_s(V_o, V_{th,H}). \tag{10}$$

The above equation is the large-signal output-port I-V characteristic of the charge-controlled LLC resonant converter and is maintained in this form for simplicity.

Small-Signal Output Impedance. At perturbation frequencies much less than the switching frequency, Eq. (8) may be perturbed and linearized, so that the perturbation energy does not affect the stored energy within one switching cycle. The input current perturbation can also be derived using Eq. (6). The input voltage and the control variable perturbations can be forced to zero to derive Eq. (11). At the output node, the rectified dc current perturbation can be derived as follows:

$$I_{sec}\tilde{v}_o + V_o\tilde{i}_{sec} = 4C_r V_{th,H} V_{in}\tilde{f}_s \tag{11}$$

and $\tilde{i}_{in} = 4C_r V_{th,H}\tilde{f}_s$ $$\tilde{i}_{sec} = \tilde{v}_o\left(\frac{sC_f R_L + 1}{R_L}\right) + \tilde{i}_o. \tag{12}$$

$\tilde{i}_o$ is the load disturbance in the direction away from the output node. Eliminating $\tilde{f}_s$, $I_{sec}$, and $\tilde{i}_{sec}$ from Eq. (11) using Eqs. (2), (8), and (12), the small-signal output impedance and its unterminated version are derived in the following equations:

$$Z_o(s) = -\frac{\tilde{v}_o}{\tilde{i}_o} = -\frac{V_o/K_d}{4C_r V_{th,H} V_{in} - \frac{1}{K_d}\frac{V_o}{R_L}(sC_f R_L + 2)} \tag{13}$$

$$Z_{o,un}(s) = \lim_{R_L \to \infty} Z_o(s) = -\frac{V_o/K_d}{4C_r V_{th,H} V_{in} - \frac{V_o}{K_d}sC_f}. \tag{14}$$

The proposed models can be used to investigate the stability in parallel-connected LLC resonant converters in the following Paralleling of LLC Resonant Converters Section, as well as to identify a novel load sharing technique for such systems in the Common Inner Reference Control of Paralleled LLC Resonant Converters Section below.

Paralleling of LLC Resonant Converters

Figure 5A:
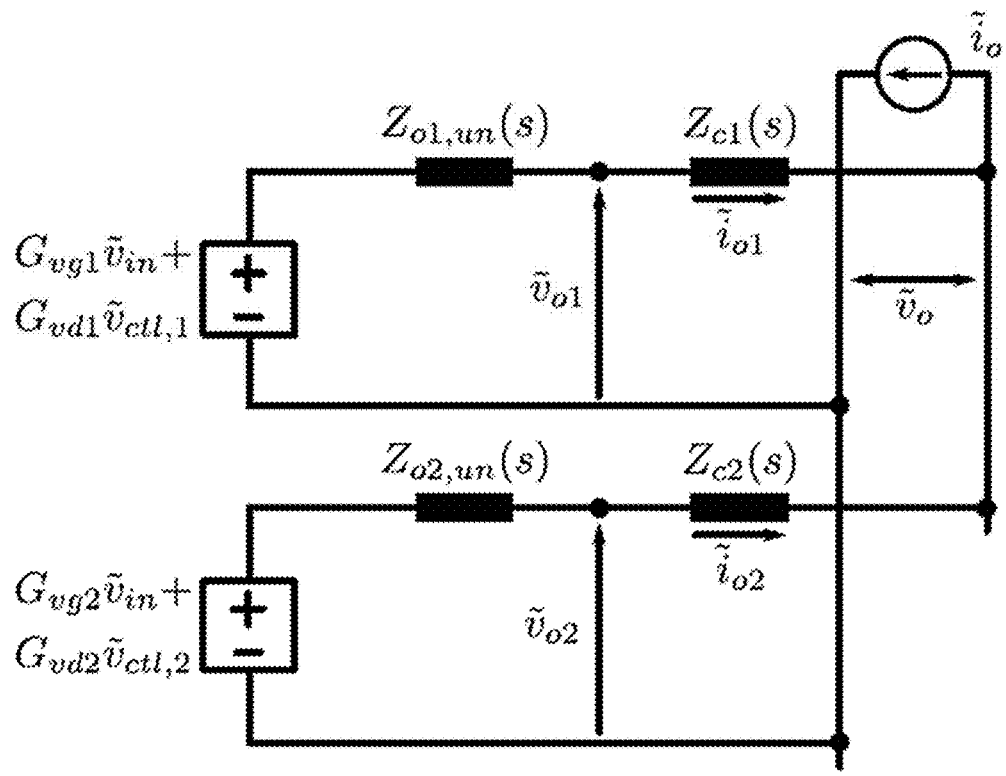
FIGS. 5A and 5B illustrate an example of a small-signal Thévenin equivalent circuit of two parallel-connected converters and an example of a control structure for the j-th converter, in accordance with various embodiments of the present disclosure.
Figure 5B:
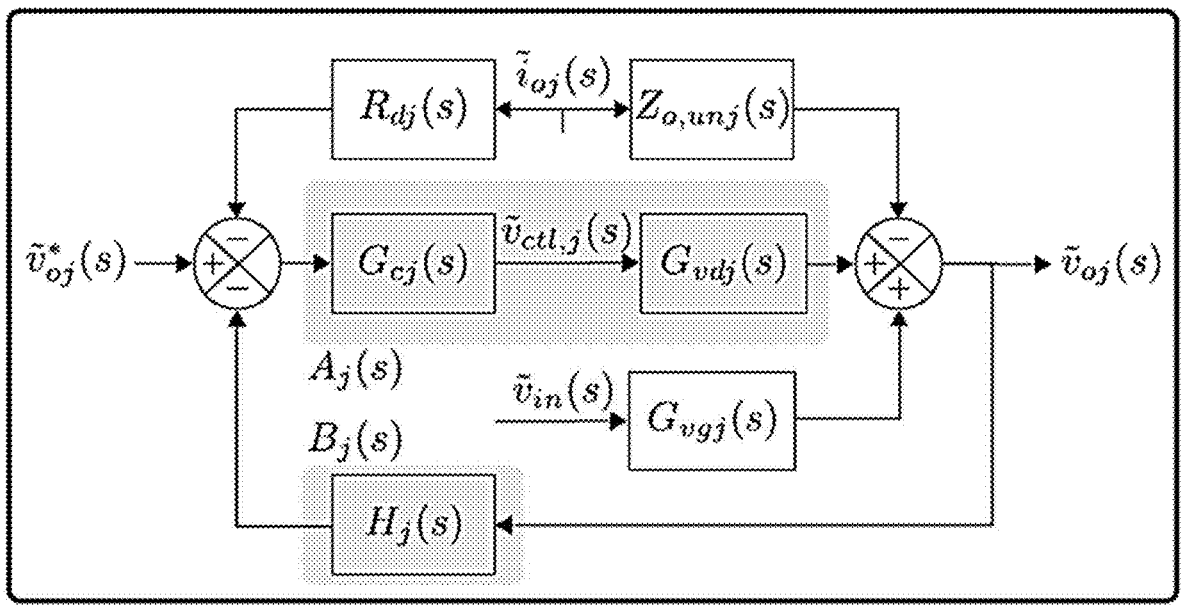

There are several methods reported in the literature for paralleling dc-dc converter systems. These can be classified into droop-based and active current sharing techniques. In large body systems where converters are connected in parallel to feed a common load, droop current sharing technique is preferred. It accords increased reliability, fault redundancy, improved noise immunity and reduced cabling. The equivalent circuit diagram of a two-converter system is shown in FIG. 5A. Each converter is represented by its Thévenin equivalent circuit, connected to the load bus through a lumped impedance of the cable. The controller structure of the individual j-th converter, along with the virtual droop resistance ($R_{dj}$), is shown in FIG. 5B. $A_j$, $B_j$ are the respective forward and feedback path transfer functions, and its output response is derived in the following equation for zero input voltage perturbation:

$$\tilde{v}_{oj} = \frac{1}{1 + A_j B_j} \left[ -(Z_{o,unj} + A_j R_{dj}) \tilde{i}_{oj} + A_j \tilde{v}_{oj}^* \right]. \tag{15}$$

Determination of DC Bus Stability. Consider that the system of parallel-connected converters (LLC-1, LLC-2) is feeding a constant-current load; its small-signal input impedance is infinite. As a first step, the converter output currents are expressed in the following equation:

$$\tilde{i}_{o1} = \frac{\tilde{v}_{o1} - \tilde{v}_o}{Z_{c1}}; \tilde{i}_{o2} = \frac{\tilde{v}_{o2} - \tilde{v}_o}{Z_{c2}}. \tag{16}$$

$Z_{c1}$, $Z_{c2}$ are the lumped impedance of the cables connecting the converter outputs to the load. The output current of j-th converter can be expressed in the following equation by using Eqs. (15) and (16):

$$\tilde{i}_{oj}(Z_j + Z_{cj}) = T_j \tilde{v}_{oj}^* - \tilde{v}_o \tag{17}$$

$$T_j = \frac{A_j}{1 + A_j B_j}; Z_j = \frac{Z_{o,unj}}{1 + A_j B_j} + \frac{A_j R_{dj}}{1 + A_j B_j}.$$

In absence of the load current perturbation, i.e., $\tilde{i}_o \to 0$, for a constant current load, the perturbations in converter output currents must add to zero. The output voltage is, therefore, expressed in terms of reference voltages in the following equation:

$$\tilde{i}_{o1} + \tilde{i}_{o2} = \frac{T_1 \tilde{v}_{o1}^* - \tilde{v}_o}{Z_1 + Z_{c1}} + \frac{T_2 \tilde{v}_{o2}^* - \tilde{v}_o}{Z_2 + Z_{c2}} = 0. \tag{18}$$

Assuming that the reference voltage perturbation of LLC-1 is nonzero and that of LLC-2 is zero, Eq. (18) can be re-written as $$\tilde{v}_o = T_1 \tilde{v}_{o1}^* \left[ 1 + \frac{Z_1 + Z_{c1}}{Z_2 + Z_{c2}} \right]^{-1} = \frac{T_1 \tilde{v}_{o1}^*}{1 + T_{m-out,1}}. \tag{19}$$

The expression of output voltage ($\tilde{v}_o$) to the reference of LLC-2 ($\tilde{v}_{o2}^*$) may be similarly derived. If the converters are assumed to be independently stable, i.e., $T_1$ and $T_2$ contain only left-half plane poles, then the dc bus stability can be determined by the minor loop gains, $T_{m-out,1}$, 1 and $T_{m-out,2}$.

Determination of Circulating Current Mode Stability. This mode of stability is determined by the transfer functions of the output currents of the two converters and their reference voltages, such as that derived for LLC-1 using Eqs. (17) and (19)

$$\frac{\tilde{i}_{o1}}{\tilde{v}_{o1}^*} = T_1 \cdot \frac{1}{Z_2 + Z_{c2}} \cdot \left[ \frac{1}{1 + T_{m-out,1}} \right] \tag{20}$$

$$\frac{\tilde{i}_{o2}}{\tilde{v}_{o2}^*} = -T_2 \cdot \frac{1}{Z_2 + Z_{c2}} \cdot \left[ \frac{1}{1 + T_{m-out,1}} \right].$$

Similar transfer functions between the output current of LLC-2 ($\tilde{i}_{o2}$) and the reference output voltages ($\tilde{v}_{o1}^*$, $\tilde{v}_{o2}^*$) may also be derived. The dc bus voltage stability is ensured through appropriate design of the minor loop gains, $T_{m-out,1}$ and $T_{m-out,2}$. Therefore, the roots of $Z_1 + Z_{c1}$ and $Z_2 + Z_{c2}$ determine the circulating current mode stability. These roots do not appear in the characteristic equation of the output dc bus voltage stability expressed in Eq. (19).

The developed analyses are applied to a parallel-connected system of two LLC resonant converters. The LLC resonant converter parameters are listed in the table of FIG. 6 and differ only by their component tolerance and loadside cabling. The controllers designed for LLC-1 to regulate its output dc voltage through charge and frequency control methods are implemented on both the converters.

Description of Controller. A negative voltage feedback loop regulates the output voltage of the converters. A 3-pole, 2-zero regulator of Eq. (21) ($\kappa_v = 1.0$) controls the frequency-controlled LLC resonant converter, whereas a proportional-integral regulator of Eq. (22) ($\kappa_b = 1.0$) controls the charge-controlled system $$G_{c,VFC}(s) = -\kappa_v \frac{s^2 \cdot (54.7 \cdot 10^{-4}) + s \cdot 105 + 750 \cdot 10^4}{s^3 \cdot (2.6 \cdot 10^{-12}) + s^2 \cdot (2.3 \cdot 10^{-6}) + s}. \tag{21}$$

$$G_{c,Q-CTRL}(s) = \kappa_b \left[ 30 \left( 1 + \frac{6283}{s} \right) \right], \text{ where } \kappa_b = 1.0. \tag{22}$$

The feedback gains, $H_j(s)$ and $R_{dj}(s)$, comprise of an anti-aliasing filter followed by digital low pass filter of Eq. (23):

$$H_j(s) = B_j(s) = \left( \frac{\omega_1}{s + \omega_1} \right) \left( \frac{\omega_2}{s + \omega_2} \right) \tag{23}$$

$$R_{dj}(s) = R_d \left( \frac{\omega_{d1}}{s + \omega_{d1}} \right) \left( \frac{\omega_{d2}}{s + \omega_{d2}} \right).$$

Droop resistance, $R_d$, is 0.5Ω. $\omega_1$, $\omega_2$, $\omega_{d1}$, and $\omega_{d2}$ in Eq. (23) are enumerated in the following equations:

$\omega_1 = 157$ krad/s, $\omega_2 = 93$ krad/s, $\omega_{d1} = 113$ krad/s, $\omega_{d2} = 31$ krad/s. (24)

Figure 7B:
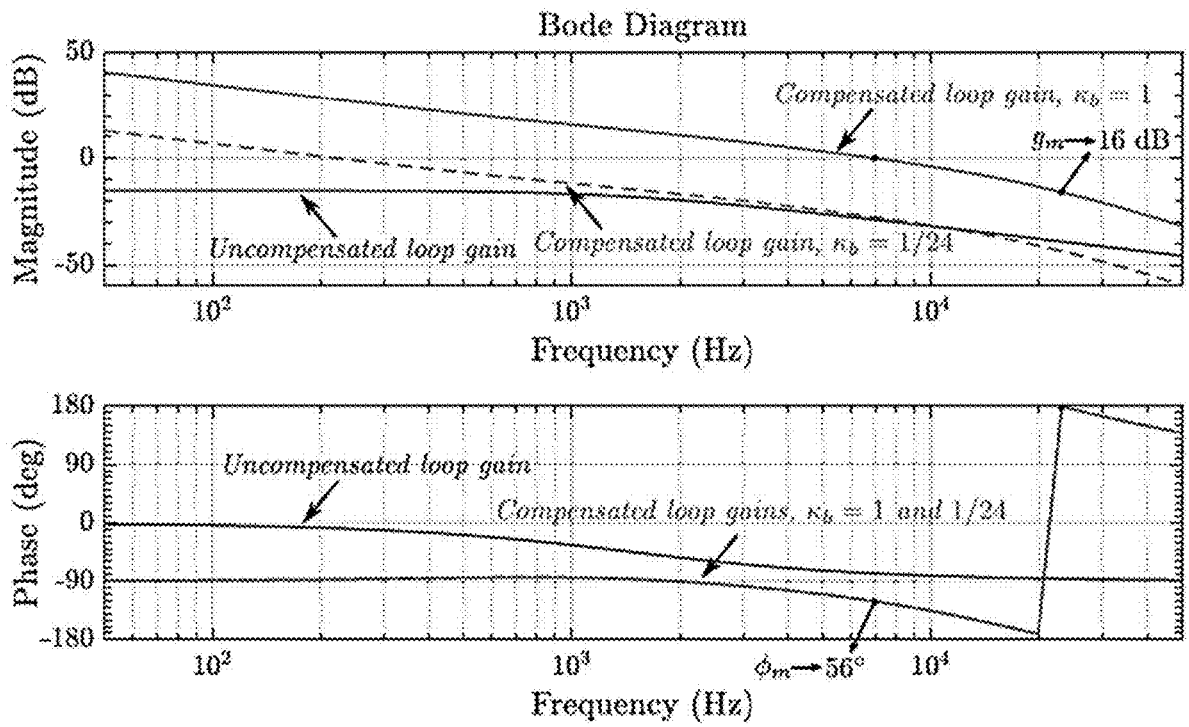

The controllers can be designed such that the gain and phase margins ($g_m$, $\varphi_m$) exceed 10 dB and 45° at 50% load with the output voltage reduced as per the droop characteristics. The frequency response plots for the uncompensated and compensated loop gains of the frequency and charge-controlled converters are illustrated in FIGS. 7A and 7B, respectively. Unlike the high bandwidth achieved using the charge control method, the double pole resonance observed in the frequency control method results in low bandwidth limited by its gain margin. In both figures, frequency response plots pertaining to two controller gains are shown for the benefit of later sections.

Figure 8A:
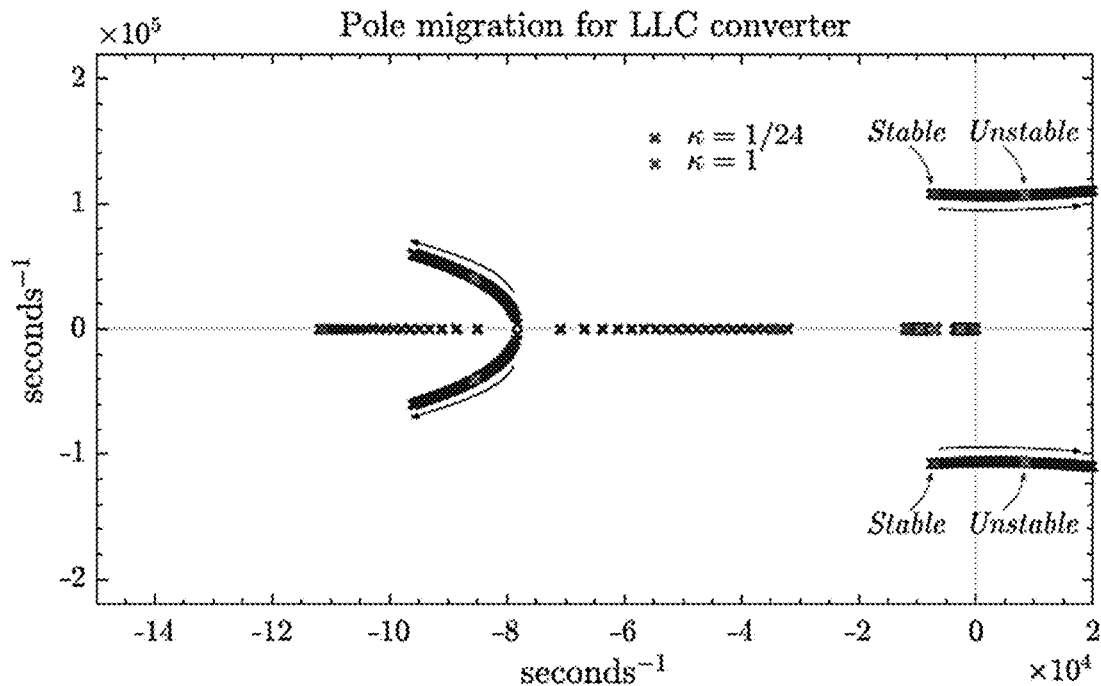
FIGS. 8A-8C illustrate example unstable characteristic roots for circulating current mode stability at high gain for a charge-controlled system: (a) $Z_1+Z_{c1}$, (b) $Z_2+Z_{c2}$; and (c) frequency response plot of minor loop gain, $T_{m\text{-}out,1}$, in accordance with various embodiments of the present disclosure.
Figure 8B:
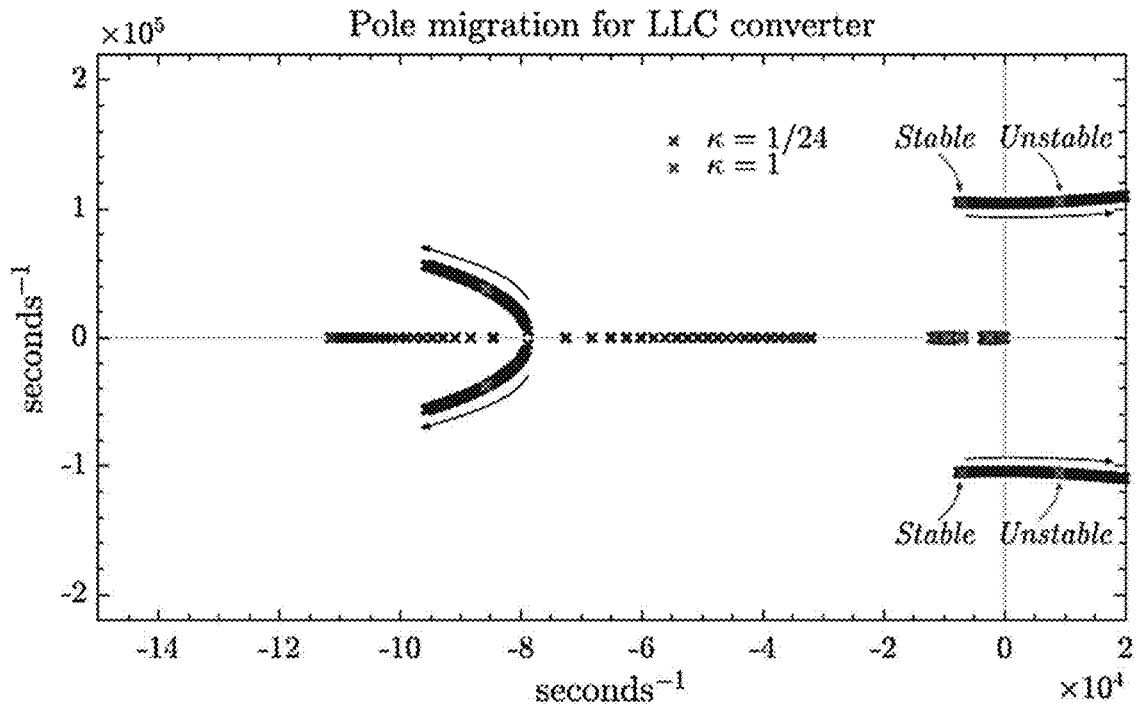
Figure 8C:
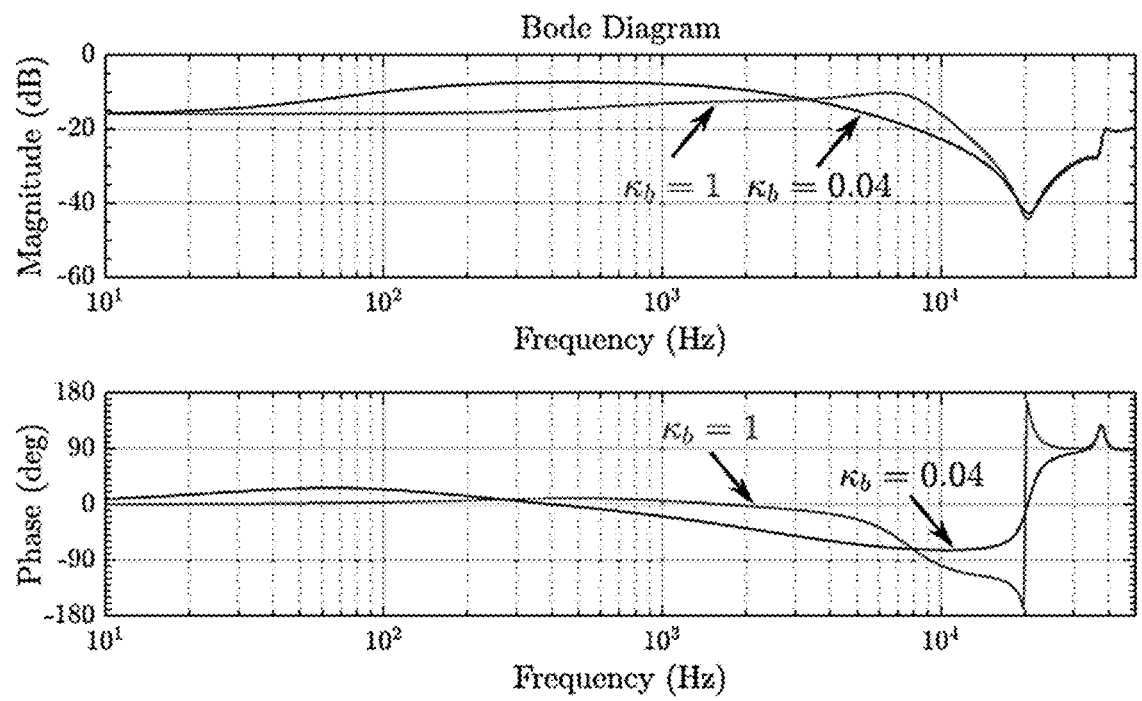

Application to Paralleled LLC Resonant Converters. For both control methods, the roots of the terms, $Z_j + Z_{cj}$ from Eq. (17), determining the circulating current mode instability are plotted as the respective controller gains are varied. Moreover, two specific controller gains are highlighted, that are implemented in the hardware for each control method. Frequency response plots of the minor loop gain, $T_{m\text{-}out,1}$, are also plotted to illustrate the dc bus stability at each value of the controller gain. For the charge control method, the controller of Eq. (22) designed for stable operation of standalone converter had unity gain, $\kappa_b$. When two such systems are parallel connected, the analyses indicate circulating current mode instability, while the dc bus remains stable. The analyses predict out-of-phase oscillations in the converter output currents at approximately 15 kHz. For the charge-controlled system, FIGS. 8A-8C illustrate unstable characteristic roots for circulating current mode stability at high gain of: (a) $Z_1+Z_{c1}$, (b) $Z_2+Z_{c2}$; and (c) frequency response plot of minor loop gain, $T_{m\text{-}out,1}$. $R_d=0.5\Omega$ and the arrows point toward the direction in which $\kappa_b$ of Eq. (22) is increasing. For $\kappa_b=1$, the plots predict circulating current mode instability at 15 kHz. Therefore, the controller should be modified to ensure stable system operation. In this case, it is achieved by reducing the gain and bandwidth, as shown in FIG. 7B. It suggests that, in this case, the system will retain stability in both modes.

Figure 9A:
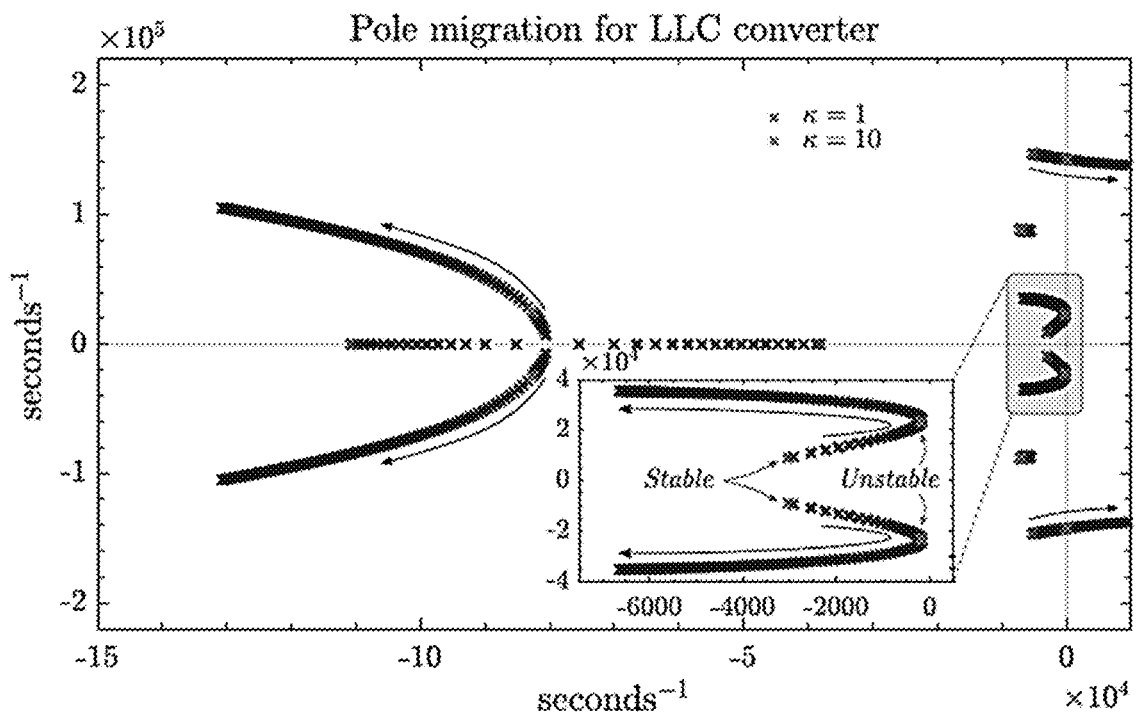
FIGS. 9A-9C illustrate example unstable characteristic roots for circulating current mode stability at high gain for a frequency-controlled system: (a) $Z_1+Z_{c1}$, (b) $Z_2+Z_{c2}$; and (c) frequency response plot of minor loop gain, $T_{m\text{-}out,1}$, in accordance with various embodiments of the present disclosure.
Figure 9B:
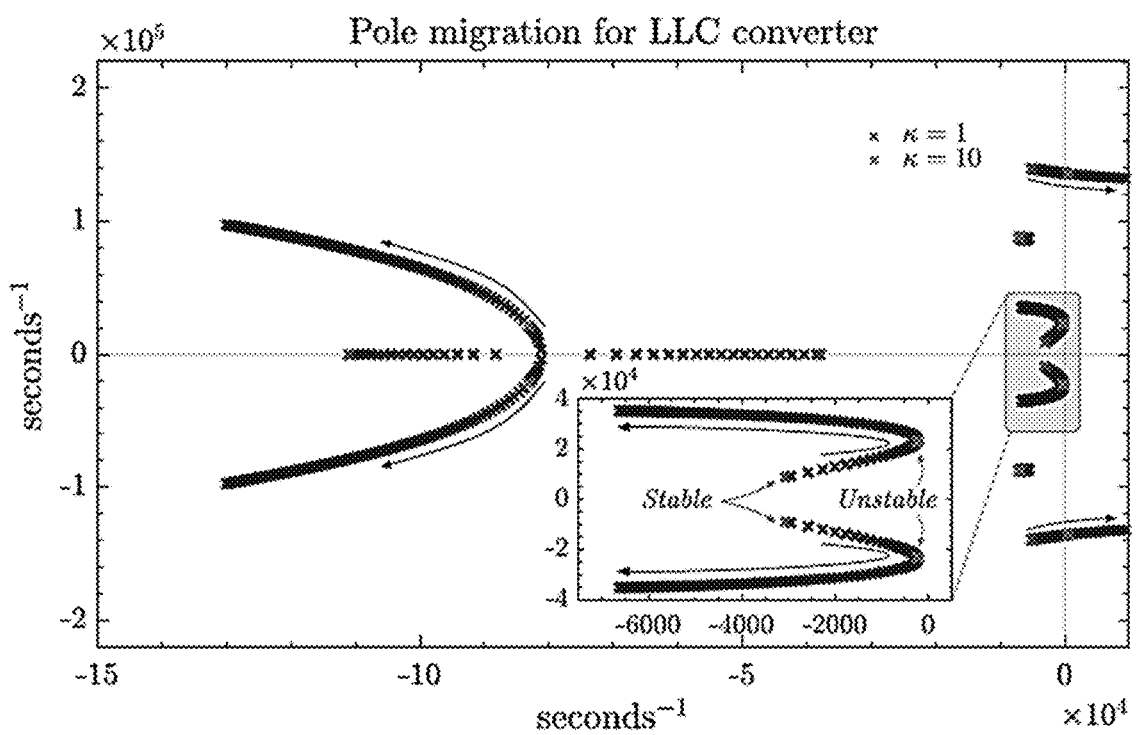
Figure 9C:
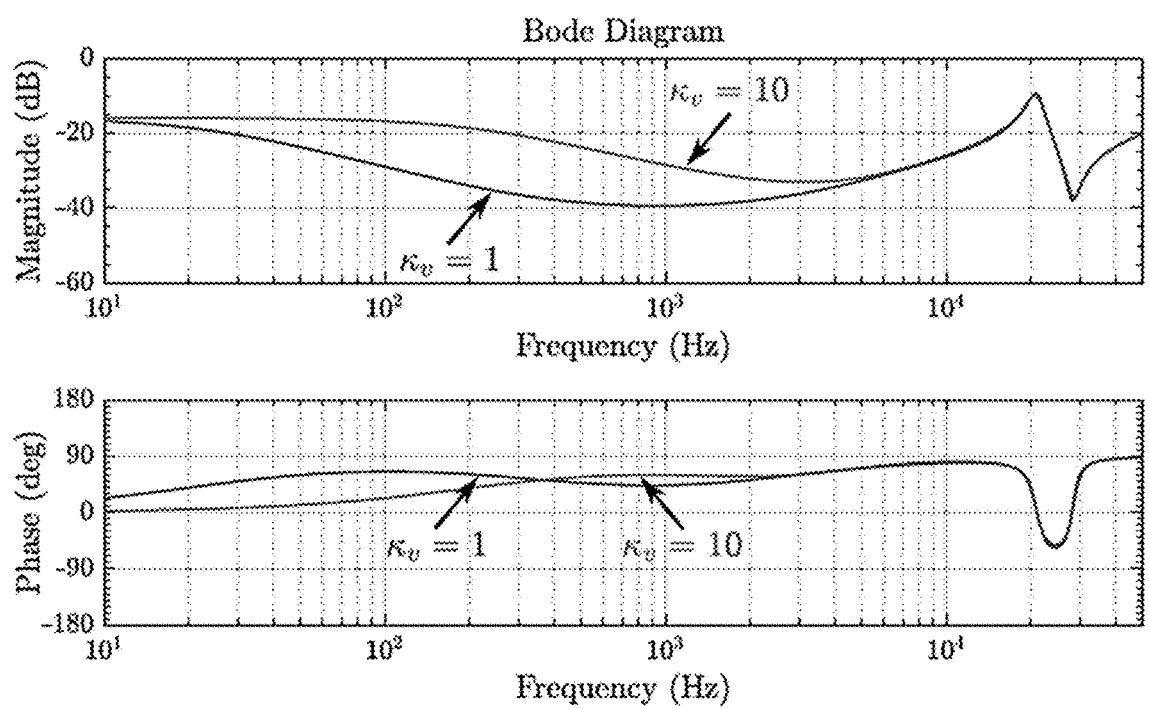

Similarly, for frequency control method, a stable dc bus voltage is predicted at the two controller gain values in FIG. 9C. However, at higher controller gain, circulating current instability is predicted at 3.8 kHz, as shown in FIGS. 9A and 9B. For the frequency-controlled system, FIGS. 9A-9C illustrate unstable characteristic roots for circulating current mode stability at high gain of: (a) $Z_1+Z_{c1}$, (b) $Z_2+Z_{c2}$; and (c) frequency response plot of minor loop gain, $T_{m\text{-}out,1}$. $R_d=0.5\Omega$ and the arrows point toward the direction in which $\kappa_v$ of Eq. (21) is increasing. For $\kappa_v=10$, the plots predict circulating current mode instability at 3.8 kHz.

Common Inner Reference Control of Paralleled LLC Resonant Converters

The advantage of the charge control method over the frequency control of LLC resonant converter is its first order control-to-output response and high closed-loop bandwidth achieved through a PI regulator. When two charge-controlled LLC resonant converters are connected in parallel, the controller designed for standalone system results in circulating current mode instability, even though the dc bus remains stable. The controller, therefore, needs modification. In the Paralleling of LLC Resonant Converters Section, the instability is removed by reducing the closed-loop bandwidth of the output voltage controller. However, this diminishes the benefits associated with the charge control method.

Figure 10:
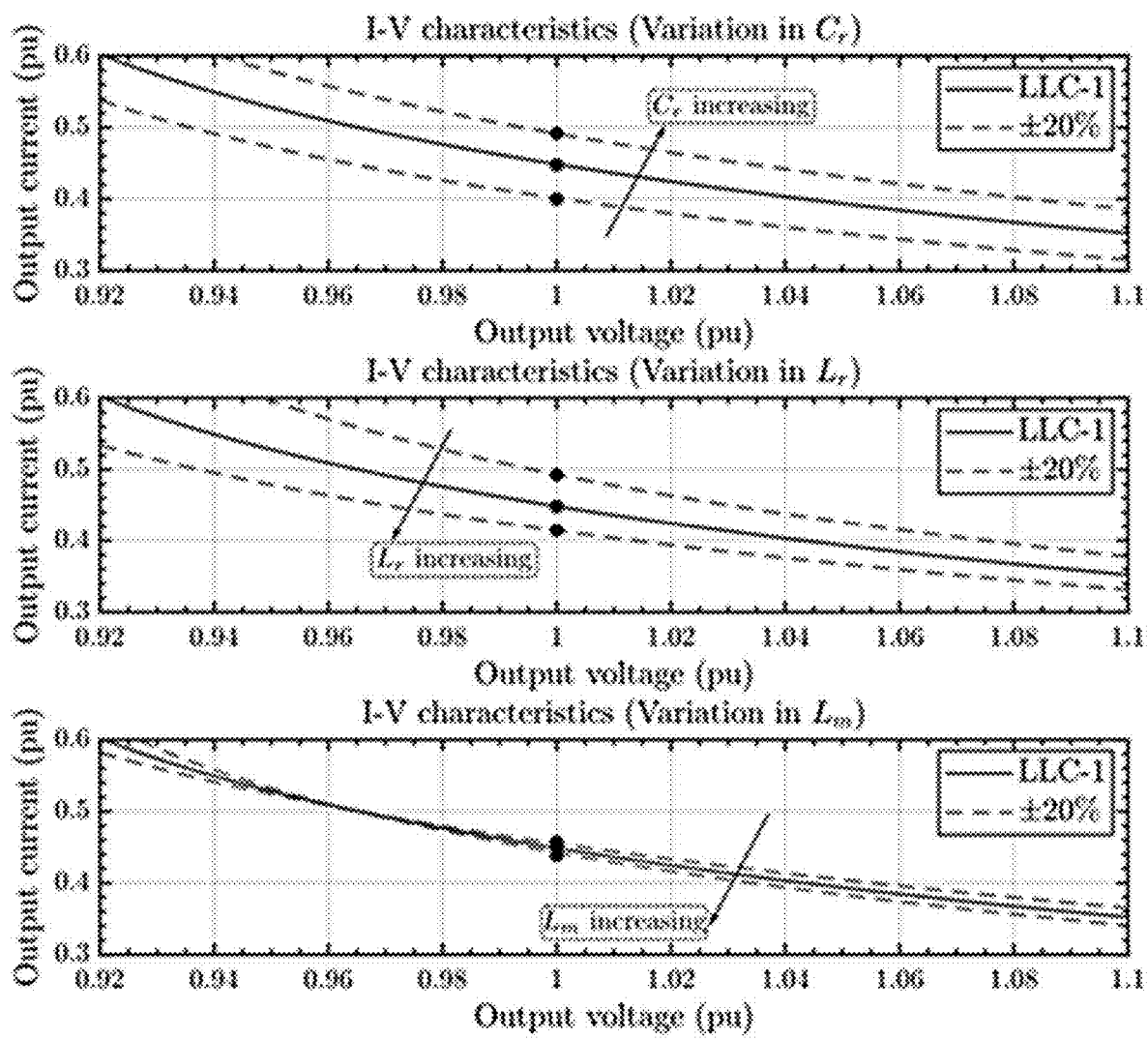
FIG. 10 illustrates an example of a large-signal output port model of a charge-controlled prototype LLC-1 including component tolerances, in accordance with various embodiments of the present disclosure.

Another method to resolve the instability without sacrificing on the control bandwidth is proposed in this section. The technique leverages the output I-V characteristics of charge-controlled LLC resonant converter. The model disclosed in the Output Port Characteristics of Charge-Controlled LLC Resonant Converter Section is plotted in FIG. 10 for the prototype LLC-1 as well as that for ±20% tolerance in resonant tank parameters. FIG. 10 illustrates an example of large-signal output port model of charge-controlled prototype LLC-1 including component tolerances. At 1 pu voltage, for a tolerance band of ±20%, the expected CDE of Eq. (25) is within 10%. Base power: 1000 W, base voltage: 56 V. It suggests that if two parallel-connected charge-controlled LLC resonant converters are supplied with a common control reference ($V_{th,H}$), automatic load sharing may be expected.

Figure 11:
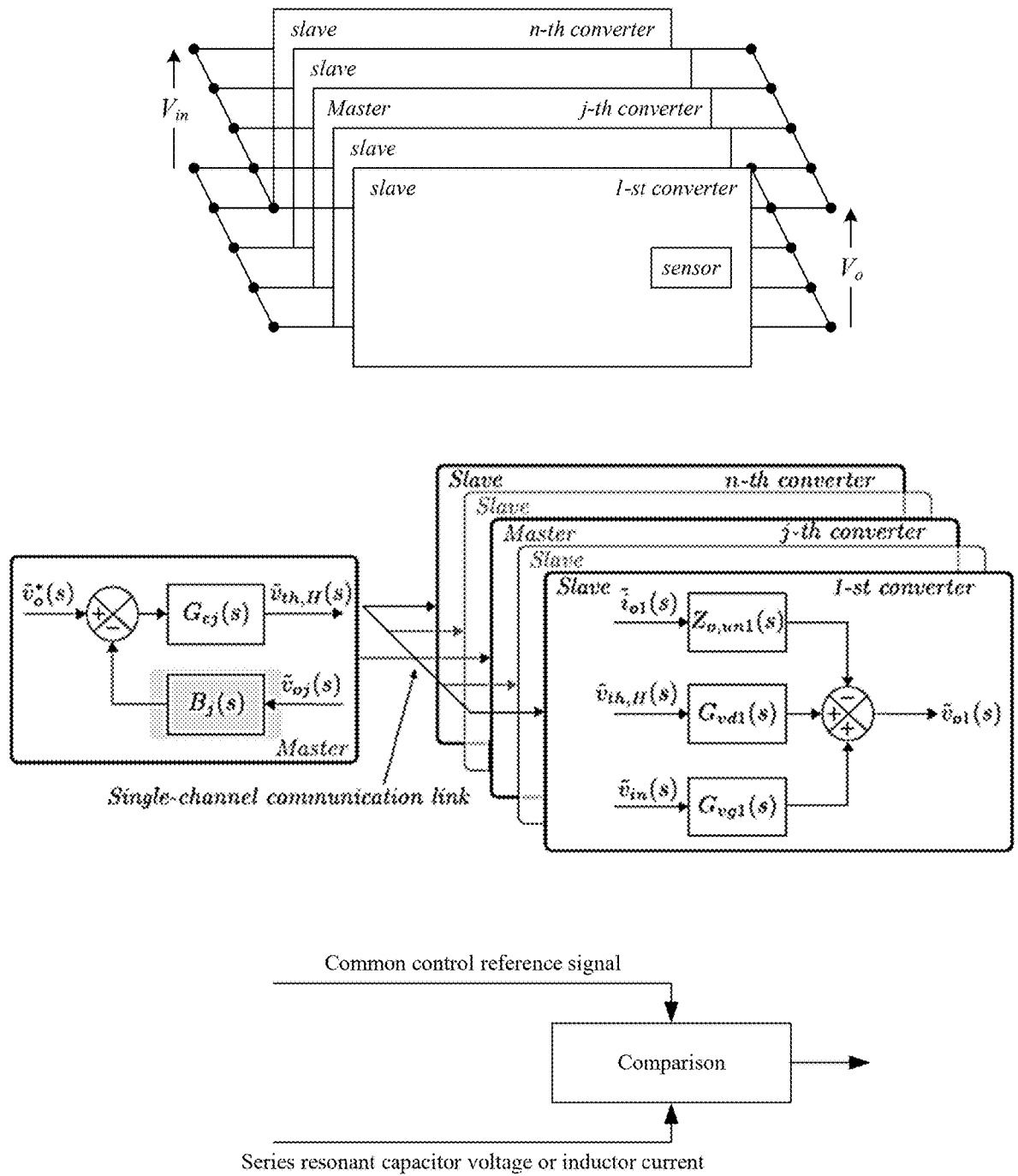
FIG. 11 illustrates an example of common inner reference based load sharing control of paralleled, charge-controlled LLC resonant converters, in accordance with various embodiments of the present disclosure.

Therefore, in a system of n-parallel connected converters, as shown in FIG. 11 one converter is assigned the "master or leader" controller. It generates the control variable signal, $V_{th,H}$, from the error amplifier of its feedback loop, and distributes it to the "slave or follower" converters through a single-channel communication, as shown in FIG. 11. The load sharing performance is characterized by the current distribution error (CDE) of Eq. (25). It was expected to be within 10% at unit voltage for a ±20% variation in component values. $I_{o,avg}$ is the average load current per converter.

$$\Delta I_{cde} = \max\left(\left|\frac{I_{o1} - I_{o,avg}}{I_{o,avg}}\right|, \left|\frac{I_{o2} - I_{o,avg}}{I_{o,avg}}\right|\right). \tag{25}$$

FIG. 10 illustrates a large-signal output port model of charge controlled prototype LLC-1 including component tolerances. At 1 pu voltage, for a tolerance band of ±20%, the expected CDE of Eq. (25) is within 10%. Base power: 1000 W, base voltage: 56 V.

Stability Analyses. The mathematical analyses of the paralleling of two converters using this technique can be extended from Eq. (18) in Eq. (26). In this case, the reference voltage perturbation is $\tilde{v}^*_{o1}=\tilde{v}^*_{o2}=\tilde{v}^*_o$.

$$\tilde{i}_{o1} + \tilde{i}_{o2} = \frac{T_1\tilde{v}^*_o - \tilde{v}_o}{Z_1 + Z_{c1}} + \frac{T_2\tilde{v}^*_o - \tilde{v}_o}{Z_2 + Z_{c2}} = 0$$

where $$Z_1 = \frac{Z_{o,un1}}{1+A_1B} \text{ and } Z_2 = \frac{Z_{o,un2}}{1+A_2B}. \tag{26}$$

$Z_{c1}$ and $Z_{c2}$ are the impedance of cables connecting the respective converters to the load bus. Note the absence of $R_{d1}$, $R_{d2}$ in the above expression, when compared to Eq. (17). Moreover, the feedback block, $B_f(s)$, is common for both converters. Eliminating $\tilde{v}_o$ from Eq. (26) using Eq. (17), the output currents of the two converters can be expressed in the following equation:

$$\frac{\tilde{i}_{o1}}{\tilde{v}^*_{o1}} = \frac{1}{Z_2 + Z_{c2}} \cdot \left[\frac{T_1 - T_2}{1 + T_{m\text{-}out,1}}\right] \tag{27}$$

$$\frac{\tilde{i}_{o2}}{\tilde{v}^*_{o1}} = \frac{1}{Z_1 + Z_{c1}} \cdot \left[\frac{T_2 - T_1}{1 + T_{m\text{-}out,2}}\right].$$

The standalone converters and the output dc bus voltage are designed for stable operation; i.e., all poles of $T_1$, $T_2$, $[1+T_{m\text{-}out,1}]^{-1}$, and $[1+T_{m\text{-}out,2}]^{-1}$ are in the left-half of the s-plane. Moreover, the terms $Z_1+Z_{c1}$ and $Z_2+Z_{c2}$ comprise closed-loop output impedance of the converter and the cable impedance. Its formulation is similar to that of a standalone converter. The system, therefore, will retain stability if that of the individual converters and the output dc bus voltage is confirmed; circulating current mode instability is not expected to appear. The technique ensures load sharing while maintaining high closed-loop control bandwidth to regulate the output voltage. It utilizes minimum, unidirectional communication link and can achieve excellent voltage regulation. It also mitigates the need for any output dc current or voltage sensors in the constituent converters. The complete system requires only one PI regulator and an output voltage feedback signal that may be measured locally or at the load bus.

The disadvantage of the method is that a single point of failure is introduced in the form of the communication link. However, it is noncritical, as the inherent droop characteristics of the charge-controlled converter (FIG. 10) should allow the system to operate within the restricted operating range.

Impact of Communication Delay. In standalone charge-controlled LLC resonant converter, the inner loop is only defined by the delay introduced due to modulation. It is equal to half the switching period and is similar to that introduced by the PWM in fixed frequency converters. As the proposed load sharing strategy depends on the single-channel communication link, the impact of the associated latency and its filters must also be considered.

There are two steps to mitigate the effects of communication delays: a) increase the speed of communication, and b) pass the inner loop reference for all converters through the network. It ensures that the propagation delays in the master and slave converters are small and matched. In this article, the network is implemented through a laboratory prototype board and the DAC/ADC peripherals of the constituent controllers sampled at the switching frequency. The latency is, therefore, neglected and the delay is only related to the associated filters. A single pole filter with the cut-off frequency of 20 kHz is used for noise attenuation and the modified forward path gain, $A_{j,mod}$, is expressed in Eq. (28). It causes phase margin degradation in the loop gain as shown in FIG. 12, which may be improved by modifying the filters of the output voltage feedback signal or other controller parameters $$A_{j,mod} = \frac{A_j}{1 + s/\omega_{comm}} \text{ where } \omega_{comm} = 125 krad/s. \quad (28)$$

Figure 12:
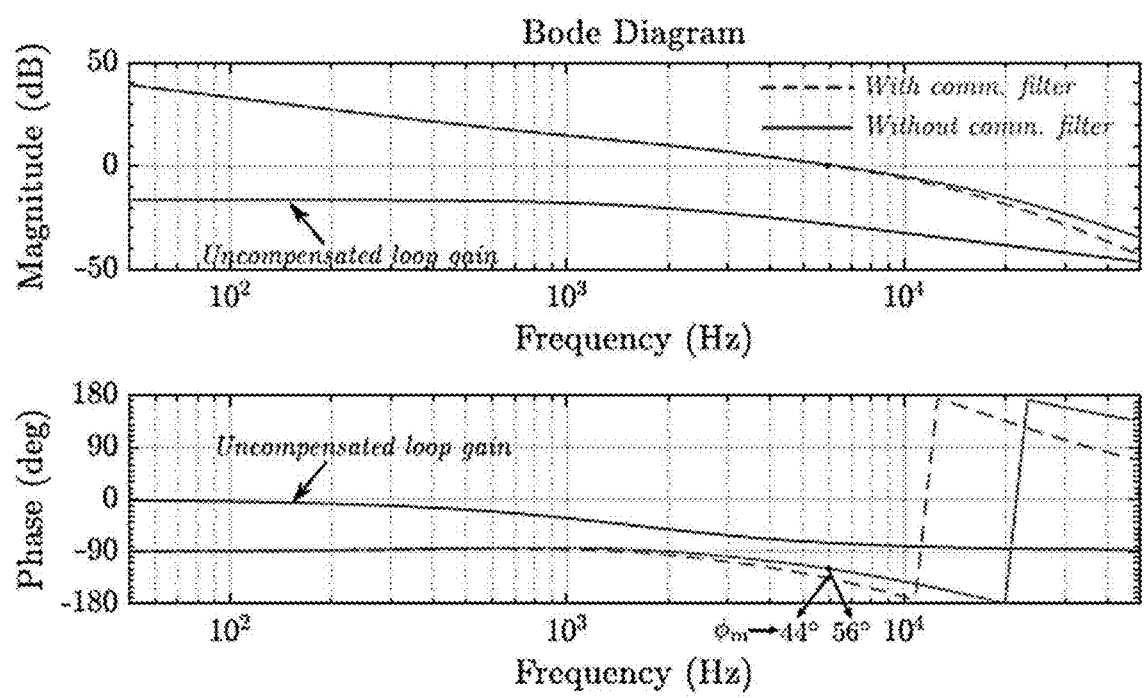
FIG. 12 illustrates an example of effect of communication filters in common inner reference control on the loop gain at 50% load ($\kappa_b$=1), in accordance with various embodiments of the present disclosure.

FIG. 12 illustrates an example of effect of communication filters in common inner reference control on the loop gain at 50% load ($\kappa_b=1$). The output dc bus is 56 V.

Results and Discussion

Figure 13:
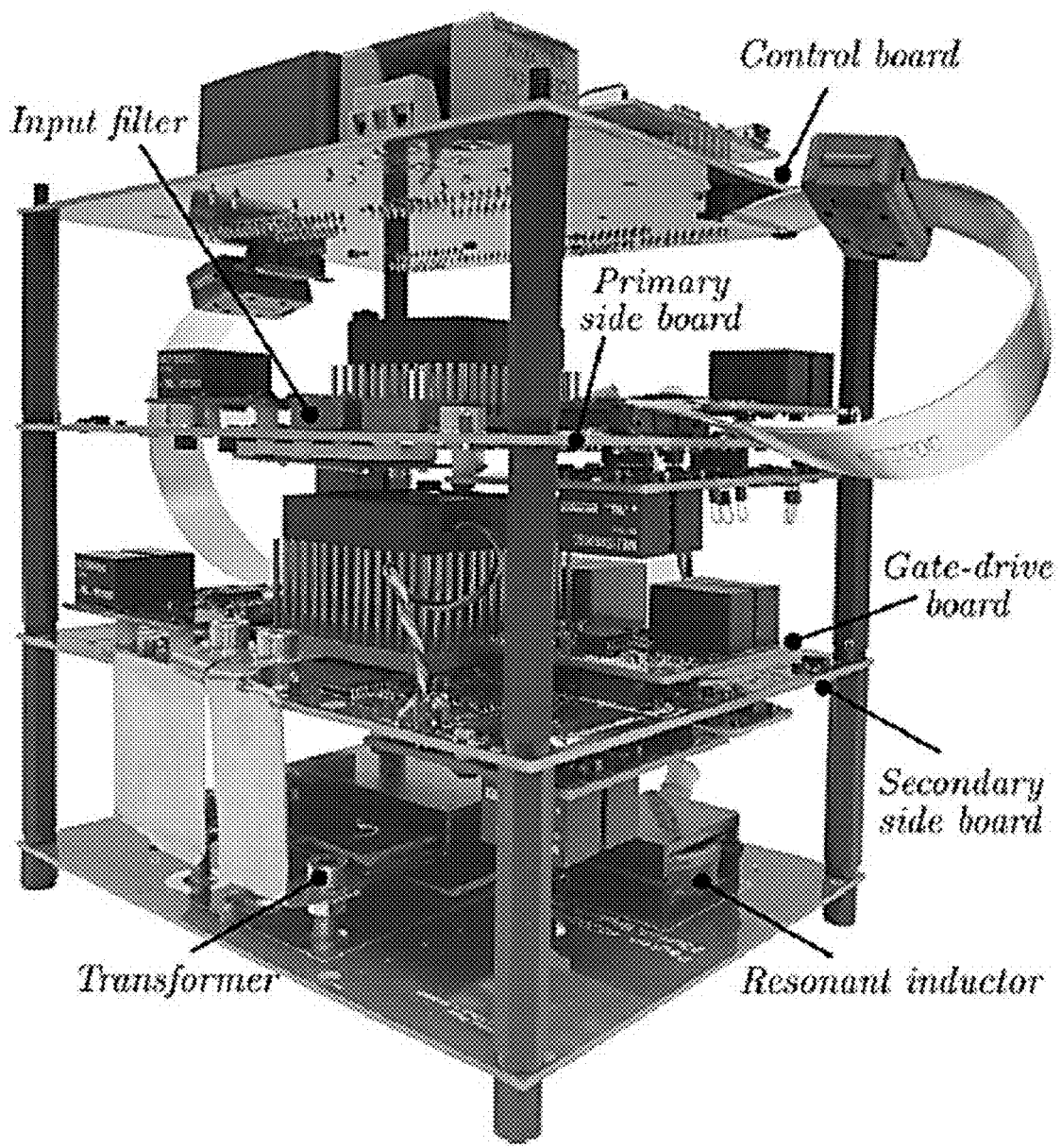
FIG. 13 is an image of a hardware prototype of the LLC resonant converter, in accordance with various embodiments of the present disclosure.

The LLC resonant converter system was developed according to the specifications in the table of FIG. 6. It utilizes 650 V and 100 V GaN Systems semiconductor devices (GS66516T and GS61008T) for primary and secondary side of the converter. The magnetic elements in resonant circuit comprise of planar inductor and transformer. The resonant capacitor bank is composed of 18 parallel multilayer ceramic chip (MLCC) capacitors with COG dielectric, exhibiting no change in capacitance with voltage. The output capacitors are polyethylene (PET) film-type capacitors. The input filter is composed of surface-mount PLZT-based TDK Ceralink capacitors. The hardware prototype of the LLC resonant converter is shown in FIG. 13. Validation of Output Port Characteristic Models.

Figure 14A:
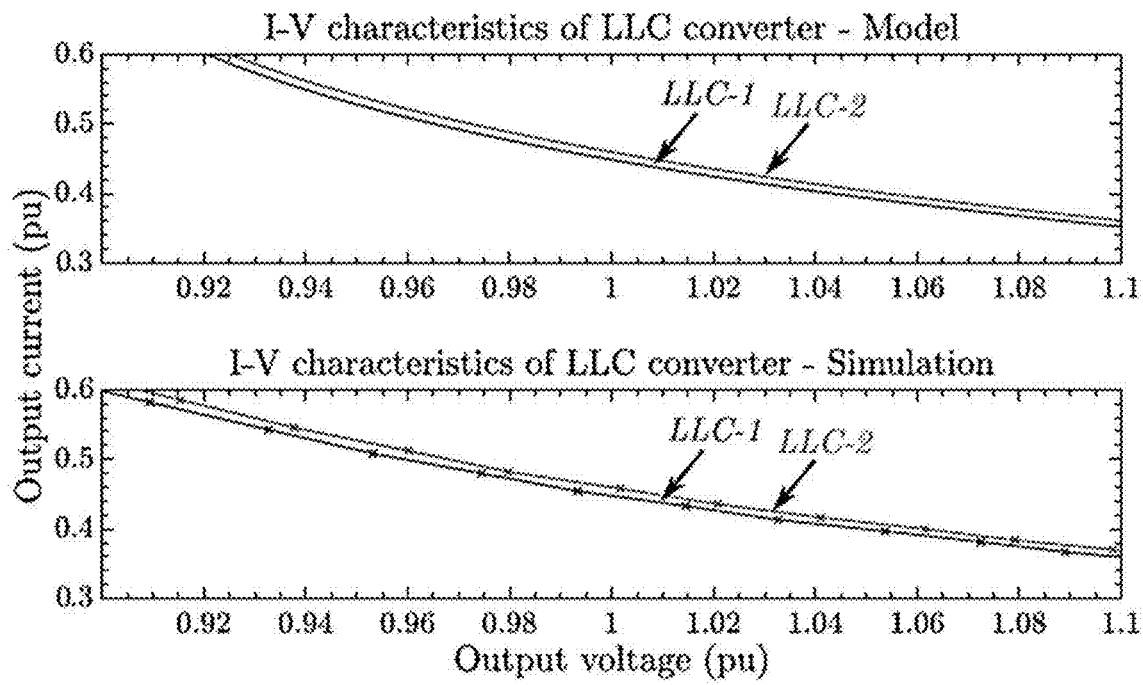
FIGS. 14A and 14B illustrate an example comparison of large-signal output port model with simulation for open-loop (a) charge and (b) frequency control methods, in accordance with various embodiments of the present disclosure.
Figure 14B:
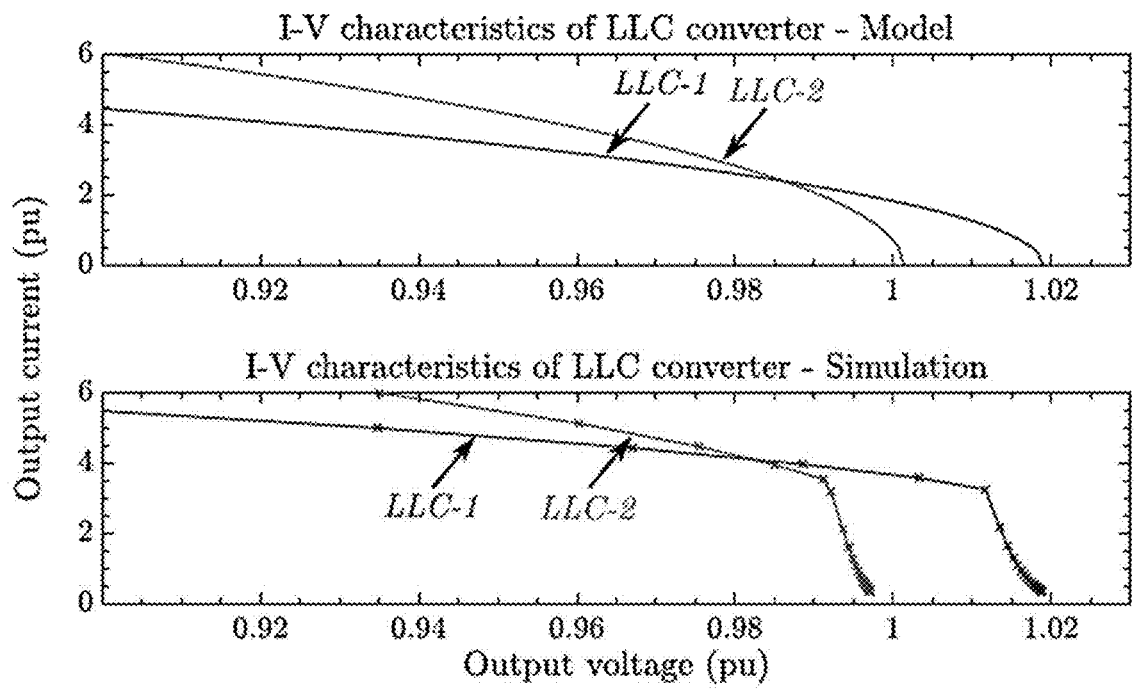

Output-port large-signal I-V model: In this section, the output port I-V characteristics of the charge-controlled LLC resonant converter are validated through simulation using PLECS v4.3.5. Two prototypes of LLC converters were considered and their parameters are listed in the table of FIG. 6. FIGS. 14A and 14B illustrate a comparison of large-signal output port model with simulation for open-loop (a) charge and (b) frequency control methods. Base power: 1000 W, and base voltage: 56 V. The I-V characteristics of the charge-controlled converter are plotted in FIG. 14A. The analytical and simulation data illustrate that in steady-state, the output port of the charge-controlled converter behaves as a constant power source. The discrepancy in load voltage predicted by the model and that derived from simulation is less than 2%. It appears due to the fundamental frequency approximation used in the analyses. FIG. 14A also suggests that automatic load sharing (with CDE<1%) between the prototype converters is possible without active or droop techniques, if the threshold resonant capacitor voltage ($V_{th,H}$) is common for all converters.

In contrast, the open-loop output-port characteristics of the frequency-controlled converter for the two prototypes are shown in FIG. 14B. It illustrates that the load sharing between the converters will be low or nonexistent, even when the component tolerances are small. Therefore, load sharing must be ensured through active or droop techniques.

The large-signal models in FIGS. 14A and 14B illustrate the distinct advantage of the charge control method for parallel connection of LLC converters over the conventional frequency control.

Figure 15:
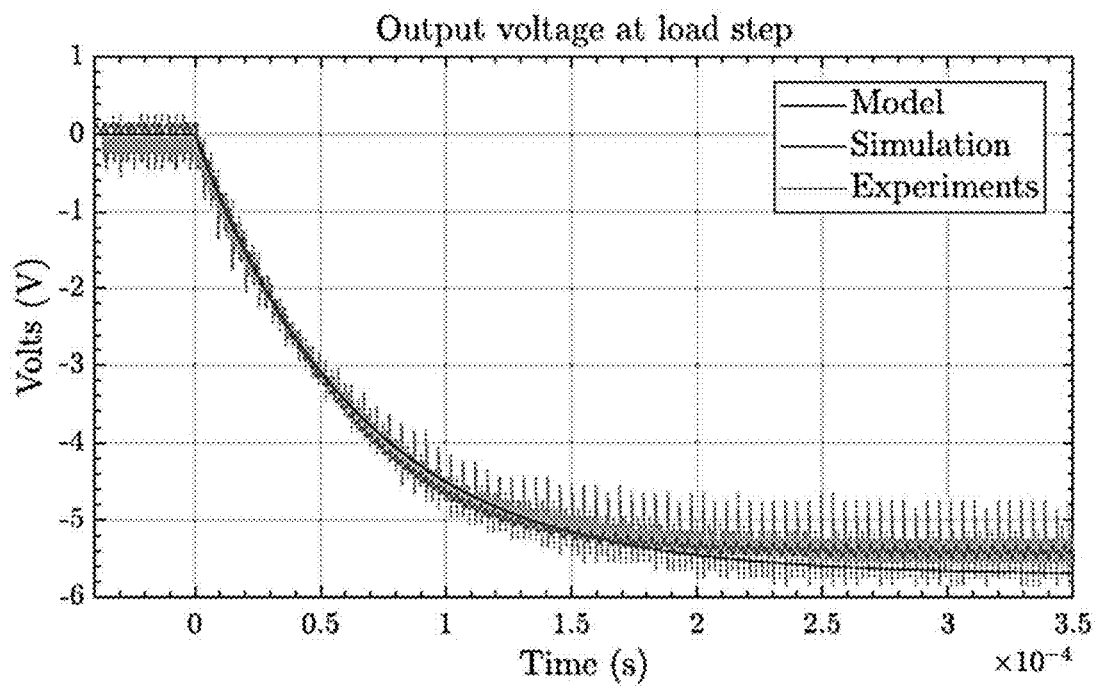
FIG. 15 illustrates an example of open-loop step-response plots for load disturbance in a charge-control method, in accordance with various embodiments of the present disclosure.

Small-signal output impedance: The small-signal output impedance of the charge-controlled converter is verified through the output voltage response to a step-change in load from 45% to 75%. Its analytical model of Eq. (13) predicts a first order response. The step-responses extracted from simulation and experiments on prototype LLC-1 confirm the analyses, as shown in the charge control method of FIG. 15.

The proposed and validated output port models may be used to study the application of LLC resonant converter in multiconverter systems. The models will form the basis of stability studies and performance characterization of different control strategies. The large signal model will help in determining the acceptable component tolerances in these systems. In addition, the output port models may be used to compare the frequency and charge control methods for such complex systems; their application to paralleled LLC converters are discussed in the Paralleling of LLC Resonant Converters Section and the Common Inner Reference Control of Paralleled LLC Resonant Converters Section.

Figure 16A:
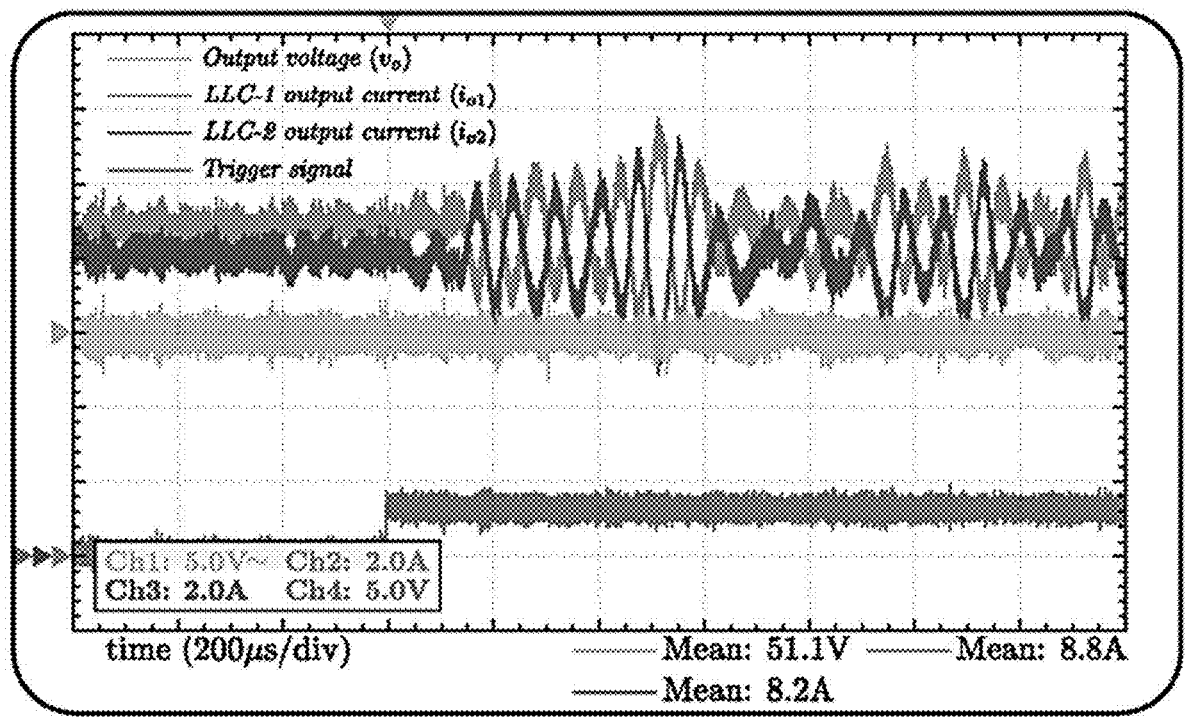
FIGS. 16A and 16B illustrates, in charge control method, output voltage and instability in output DC currents in parallel-connected system of LLC-1 and LLC-2 utilizing existing droop control method for high-bandwidth controller, in accordance with various embodiments of the present disclosure.
Figure 16B:
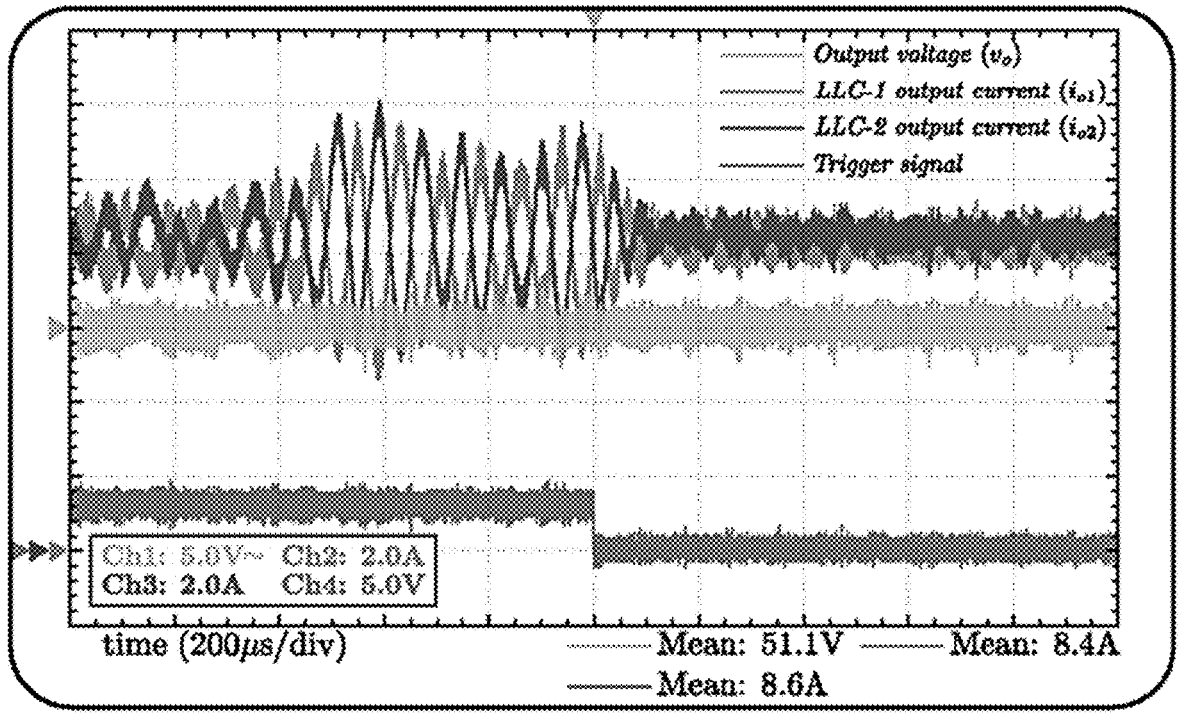

Droop-Based Parallel-Connected Converters. In this section, experimental results are presented for two parallel-connected LLC resonant converter system that shares the load using the droop technique. While the system is in steady-state, a trigger signal temporarily changes the gain and the output currents of the two converters are observed. For charge control method, the analyses predict that the controller designed for the standalone converter will result in circulating current mode instability when connected in parallel with another converter. As shown in FIGS. 16A and 16B, the output dc currents of the charge control method exhibit "sustained and out-of-phase" oscillations of about 14 kHz when the controller gain ($\kappa_b$) is unity. FIGS. 16A and 16B illustrate the charge control method: output dc currents and load voltage in parallel-connected system of LLC-1 and LLC-2 when the controller gain, $\kappa_b$, is (a) increased from 1/24 to unity and (b) decreased from unity to 1/24. For $\kappa_b=1$, circulating current mode instability is observed despite a stable output dc voltage. The 14 kHz oscillations are similar to that predicted in FIGS. 8A-8C.

The results validate the analytical models by demonstrating circulating current mode instability, while the total current feeding into the resistive load and the dc bus voltage are stable. Moreover, as predicted, the oscillations disappear when the controller gain ($\kappa_b$) is modified to 1/24. However, such modification diminishes the benefit of charge control over frequency control in terms of high closed-loop bandwidth.

Figure 17A:
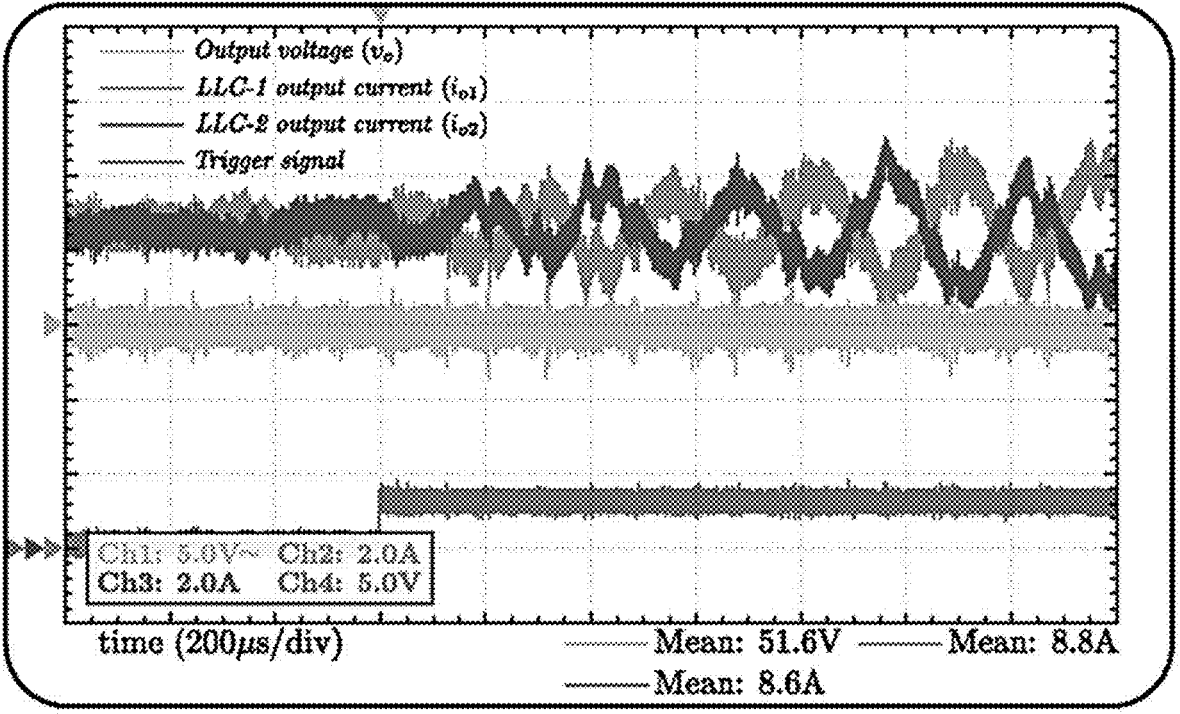
FIGS. 17A and 17B illustrates, in frequency control method, output voltage and instability in output DC currents in parallel-connected system of LLC-1 and LLC-2 utilizing existing droop control method for high bandwidth controller, in accordance with various embodiments of the present disclosure.
Figures 17B, 18:
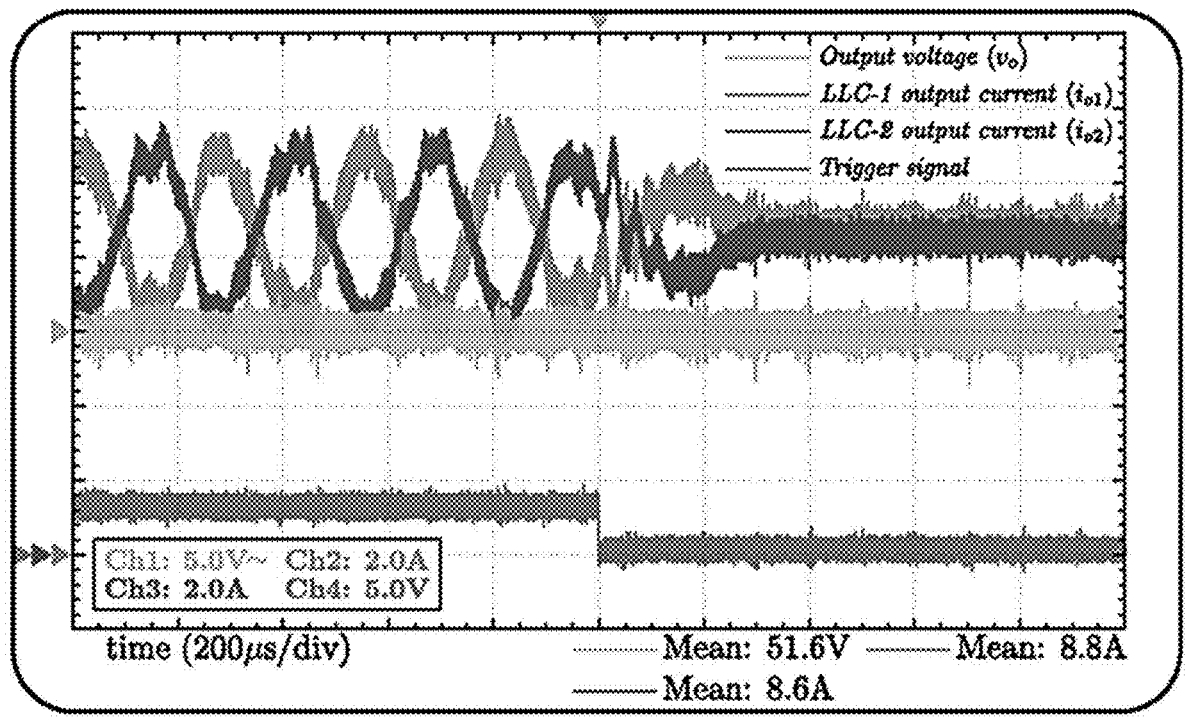
FIG. 18 is a table illustrating examples of steady-state current distribution error (CDE) in two parallel connected LLC resonant converters, in accordance with various embodiments of the present disclosure.

The analyses are also confirmed for parallel-connected frequency-controlled converters. As predicted and shown in FIGS. 17A and 17B, "sustained and out-of-phase" oscillations of 3.6 kHz appear when the gain is increased and disappear when it is reduced. FIGS. 17A and 17B illustrate the frequency control method: Output dc currents and load voltage in parallel-connected system of LLC-1 and LLC-2 when the controller gain, $\kappa_v$, is (a) increased from 1 to 10 and (b) decreased from 10 to 1. For $\kappa_v=10$, circulating current mode instability is observed despite a stable output dc voltage. The 3.6 kHz oscillations are similar to that predicted in FIGS. 9A-9C. The results illustrate the circulating current mode instability in presence of the dc bus stability. The stability analyses for parallel-connected LLC resonant converters is, therefore, validated for the two control methods.

Common Inner Reference Based Control for Charge Controlled LLC Resonant Converters. In the hardware prototype, the proposed scheme is implemented for two parallel-connected LLC resonant converters. LLC-1 is the master converter and generates the inner loop reference, i.e., the resonant capacitor voltage threshold, $V_{th,H}$. The variable can be transmitted to the controller of LLC-2 as its inner loop reference through a laboratory prototype of the communication board and the DAC/ADC peripherals of the DSP micro-controller. The advantage of charge control method over the frequency control method can be demonstrated for LLC resonant converters connected in parallel. In open-loop frequency control, when two converters are operating at the same switching frequency, load sharing is small or nonexistent even with small tolerance in components. The results in the video file are for two parallel-connected converters operating in open-loop at 190 kHz. The CDE between the two converters rises to 44% as the input voltage is increased to 270 V.

Figure 19A:
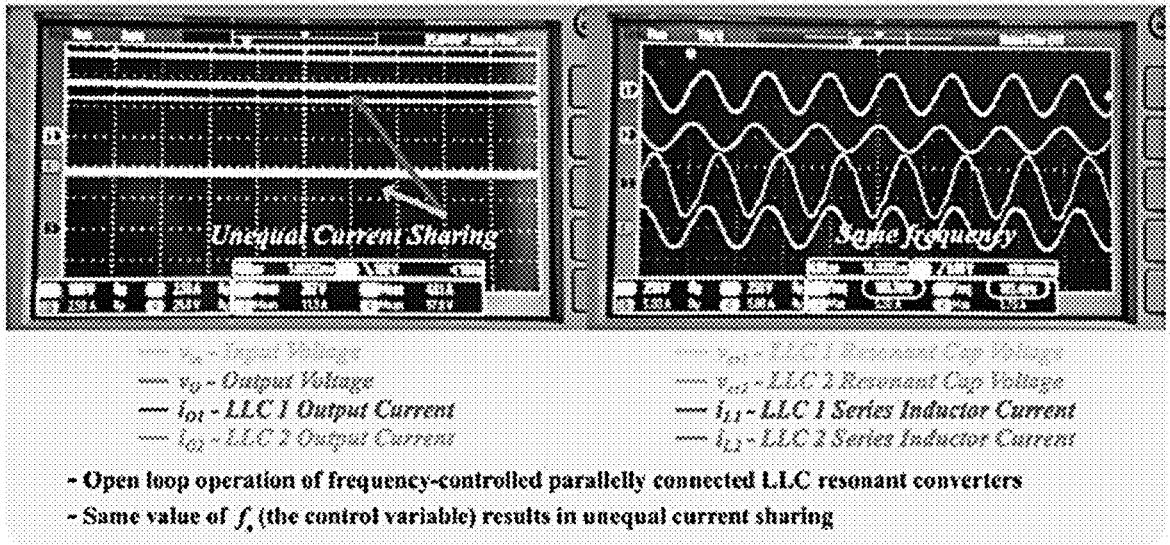
FIGS. 19A and 19B illustrate examples of advantages the charge-control method over the frequency-control method for open-loop LLC resonant converters connected in parallel, in accordance with various embodiments of the present disclosure.
Figure 19B:
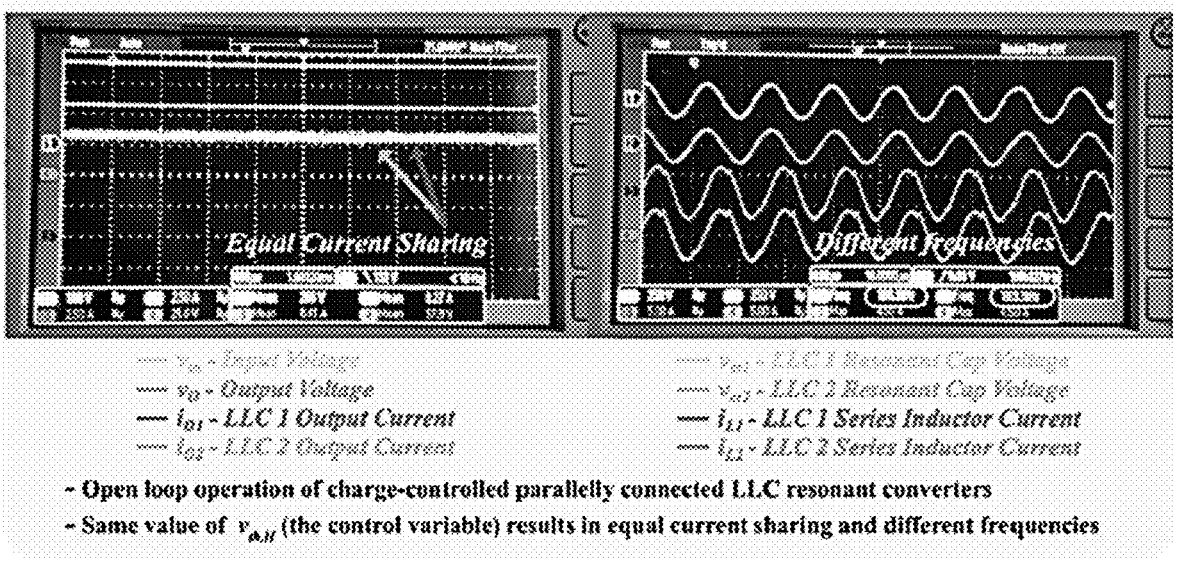

Alternatively, the experiment is repeated with the charge control method, where the parallel-connected converters are supplied with equal resonant capacitor voltage threshold ($V_{th,H}$). At low input voltages, the converters operate at the lower limit of the switching frequency, which is set as per the transformer and inductor specification. Therefore, current mismatch can be observed at the start. As the input voltage rises, the charge control method takes over and automatic load sharing (0.8% CDE) is established. The load sharing at lower input voltages may be improved by reducing the threshold ($V_{th,H}$) or by expanding the range of operating frequency. The results also show that the two converters operate at different switching frequencies and confirms that if all converters are supplied with equal $V_{th,H}$, automatic current sharing is ensured. The steady-state results for parallel-connected open-loop LLC converters are also tabulated in the table of FIG. 18 and the screenshots of respective supplementary video files are shown in FIGS. 19A and 19B. The screenshots of FIGS. 19A and 19B illustrate the advantage of the charge-control method over the frequency-control method for open-loop LLC resonant converters connected in parallel.

Figure 20A:
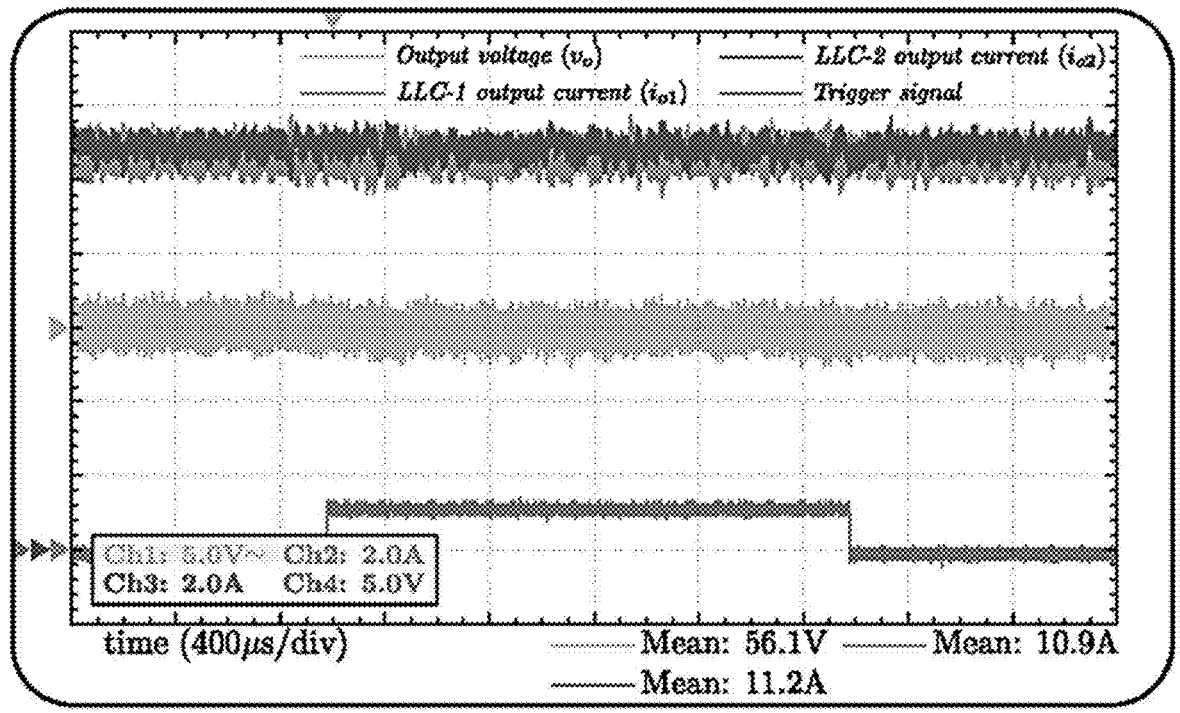
FIGS. 20A and 20B illustrate examples of common inner reference-based load sharing control strategy, in accordance with various embodiments of the present disclosure.
Figure 20B:
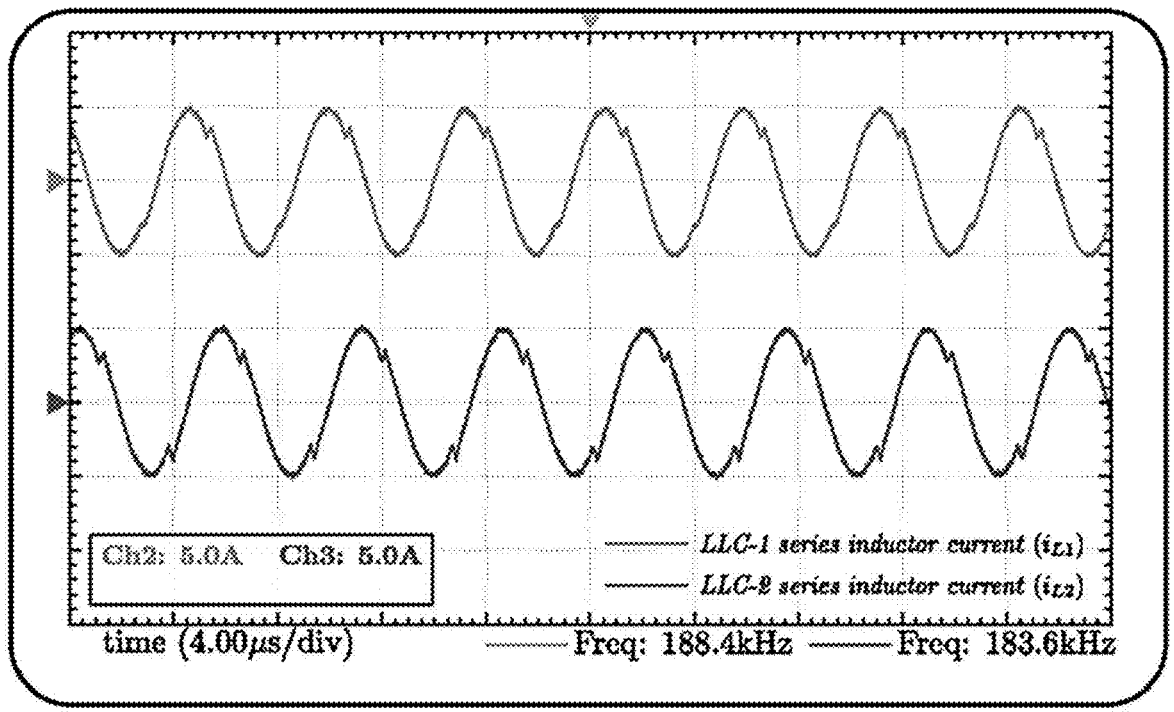

FIGS. 20A and 20B illustrate common inner reference-based load sharing control strategy. (a) Output dc currents and load voltage, and (b) primary-side series inductor currents of LLC-1 and LLC-2. For $\kappa_b=0.04 \rightarrow 1$ and vice versa, no circulating current mode or output dc bus instability is observed with the proposed strategy. In FIG. 20A, a trigger signal is shown that changes the controller gain, $\kappa_b$, of the output voltage regulator in the master (LLC-1) from unity to 1/24 and vice versa; it is similar to that executed in FIG. 16A. For both gain values, the load current is shared with negligible CDE of Eq. (25). The voltage regulation error is also zero with the output voltage controlled at 56.1 V. FIG. 20B presents the resonant current waveform of the two converters highlighting the respective switching frequencies. The test and observed parameters are summarized in the table of FIG. 21.

Figures 21, 22A:
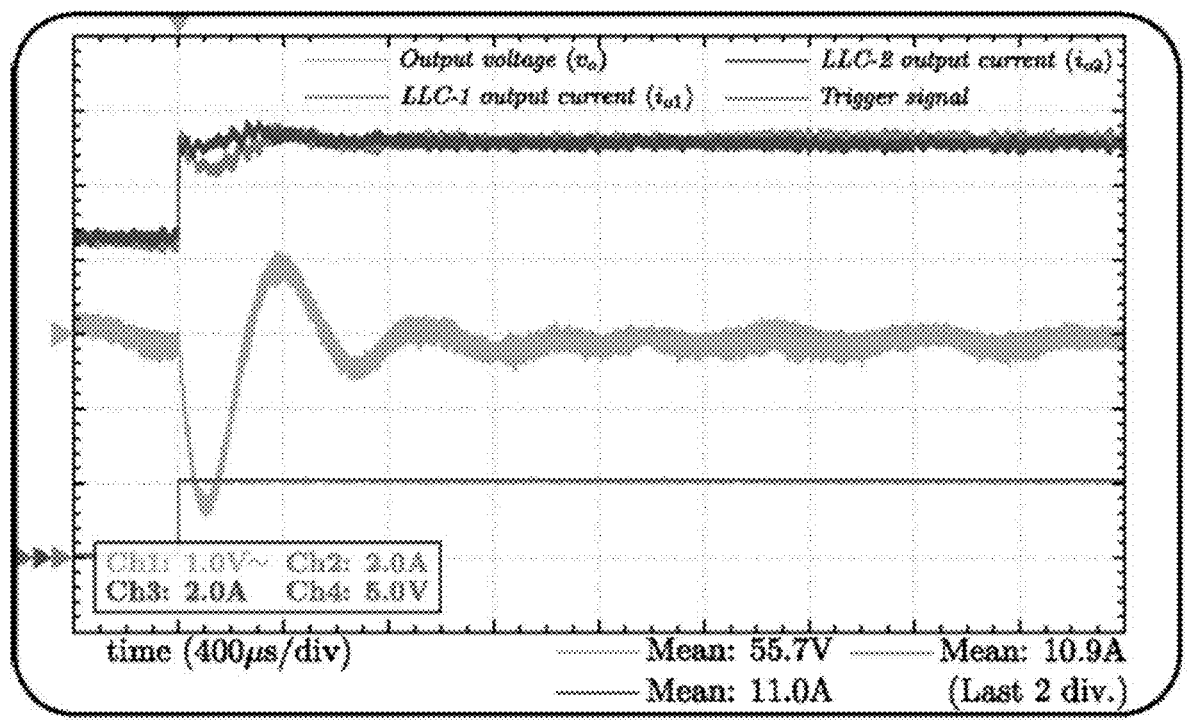
FIG. 21 is a table illustrating an example of current distribution error performance of the common inner reference load sharing strategy in parallel connected LLC resonant converters, in accordance with various embodiments of the present disclosure.
FIGS. 22A and 22B illustrates examples of output dc currents and load voltage when the load is (a) increased and (b) decreased, in accordance with various embodiments of the present disclosure.
Figure 22B:
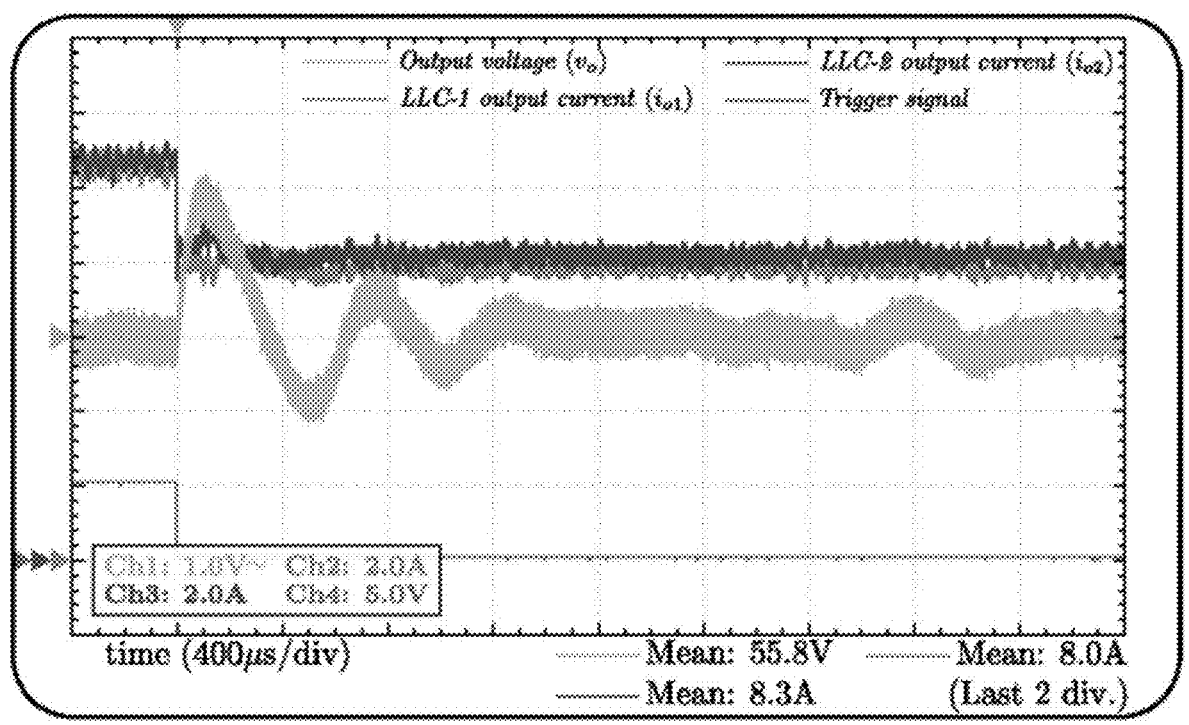

The dynamic current sharing capability of the proposed strategy can be demonstrated by affecting a 33% step-change in load, as shown in FIGS. 22A and 22B. FIGS. 22A and 22B show a common inner reference based load sharing control strategy: Output dc currents and load voltage when the load is (a) increased and (b) decreased. The CDE between the two converters is within 5% of the total current throughout the transient event and is less than 2% in, approximately, 320 μs after the event. In the analytical models, the communication latency is neglected; it can result in an unacceptable CDE if it is more than the system response time. In the prototype system, however, the assumption of negligible communication latency stands validated as the CDE does not exceed 5%. The step-change also triggers a response in the output dc bus voltage, which indicates a high closed-loop bandwidth as designed in the earlier section.

Applicability of the Proposed Load Sharing Strategy to Frequency-Controlled Converter System. The technique cannot be adapted to a system of parallel connected frequency-controlled converters. As illustrated in FIG. 14B, if the same switching frequency is communicated from the master controller to slave converters, the output voltage generated by each converter is expected to be different. It results in poor or nonexistent steady-state load sharing, as is also demonstrated through video files (FIG. 19A). However, if such converters are connected in series at their output terminals, automatic voltage sharing may be expected.

CONCLUSION

The disclosure presented a study of input-parallel, output-parallel LLC resonant converters using its two control methods: charge and frequency control. In this respect, the large-signal output port I-V characteristics and the small-signal output impedance of the charge-controlled LLC converter are developed. These characteristics are validated through simulation and experiments and are significantly different than those reported for the frequency control method. In the operating region of the converter, the large signal model exhibits constant-power type characteristics, unlike the elliptical I-V curves of the frequency control method. Further, its first order small-signal output impedance helps in designing the stability margins in multiconverter systems. The developed output port models may be used to compare the frequency and charge control methods for their use in different topologies of complex power systems. The models may also be used to conduct small-signal stability studies, performance characterization, and parametric sensitivity analyses assessing the application of LLC resonant converter in multiconverter systems.

Further, an analytical framework was developed to assess the stability in droop-based parallel-connected nonidentical dc—dc converters. It distinctly identifies the modes of stability: output dc voltage and circulating current. The framework allows independent investigation into each stability mode. Using the developed framework and the output port small-signal models, it was found that the circulating current mode instability exists in parallel-connected LLC resonant converters even though the output dc bus voltage is stable. Sustained oscillations may lead to additional losses as well as result in saturation of magnetic elements and cause protection trips or failure. The instability restricts the control bandwidth in the parallel-connected system, diminishing the key benefits of the charge control method in terms of its first order nature, fast response and simple regulator. The stability analyses are validated on a hardware prototype of two parallel-connected LLC resonant converters. The results illustrate sustained circulating current mode oscillations at the approximate predicted frequency for both control methods, thereby confirming the analyses.

The output port large-signal I-V characteristics of the charge control method in LLC resonant converters were further investigated. The constant-power type characteristics of the converter discloses its potential for parallel connection. If the resonant capacitor voltage threshold ($V_{th,H}$) is equal for two paralleled charge-controlled converters, automatic load sharing may be expected. Even in the presence of ±20% tolerance in resonant tank parameters, a current distribution error (CDE) of less than 10% may be expected. For the hardware prototype (5% tolerance) presented here, the CDE is around 1%.

Based on this, a novel application of the common inner reference load sharing strategy was identified for parallel charge-controlled LLC resonant converters. The strategy uses a noncritical, single-channel communication link to transmit the inner loop reference from a master to all the slave converters. The strategy is uniquely applied to a charge-controlled system and cannot be used with the conventional frequency control method. It allows high closed-loop bandwidth while maintaining stability, automatic load sharing, and excellent voltage regulation. It also mitigates the need for numerous regulators and dedicated voltage and current sensors at the output of each converter. The proposed strategy is validated through experimental results for its steady-state and dynamic performance when a step-change in load is applied. The proposed methodology successfully exploits the potential of the charge-control method to overcome the stability issues revealed for droop-based parallel-connected LLC resonant converters and practically realize a high bandwidth system using a simple controller structure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to about 'y'" includes "about 'x' to about 'y'".

Therefore, at least the following is claimed:

1. A resonant power converter system, comprising:
   a plurality of resonant converters connected in parallel; and
   an output voltage regulator configured to generate a common control reference voltage or current signal provided to each of the plurality of resonant converters, the common control reference voltage or current signal based at least in part upon a signal from a single output voltage sensor, where operation of each of the plurality of resonant converters is controlled in response to the common control reference voltage or current signal, wherein the common control reference voltage or current signal is communicated to the plurality of resonant converters via a communication link, and the communication link is a single-channel, unidirectional, low-bandwidth communication link with a cut-off frequency of 20 KHz.

2. The system of claim 1, wherein each of the plurality of resonant converters comprises a voltage sensor, wherein the voltage sensor is configured to monitor a series resonant capacitor voltage of the resonant converter.

3. The system of claim 2, wherein switching of the resonant converter is controlled in response to a comparison of the series resonant capacitor voltage and the common control reference voltage or current signal.

4. The system of claim 1, wherein each of the plurality of resonant converters comprises a current sensor configured to monitor a series resonant inductor current of the resonant converter.

5. The system of claim 4, wherein switching of the resonant converter is controlled in response to a comparison of the series resonant inductor current and the common control reference voltage or current signal.

6. The system of claim 1, wherein input ports and output ports of the plurality of resonant converters are connected in parallel.

7. A method, comprising:
   monitoring an output voltage of a plurality of resonant converters connected in parallel using a single output voltage sensor;
   generating a common control reference voltage or current signal based at least in part upon a signal from the single output voltage sensor; and
   providing the common control reference voltage or current signal to each of the plurality of resonant converters, where operation of each of the plurality of resonant converters is controlled in response to the common control reference voltage or current signal, wherein the common control reference voltage or current signal is communicated to the plurality of resonant converters via a communication link, and the communication link is a single-channel, unidirectional, low-bandwidth communication link with a cut-off frequency of 20 kHz.

8. The method of claim 7, wherein each of the plurality of resonant converters comprises a voltage sensor, wherein the voltage sensor is configured to monitor a series resonant capacitor voltage of the resonant converter.

9. The method of claim 8, wherein switching of the resonant converter is controlled in response to a comparison of the series resonant capacitor voltage and the common control reference voltage or current signal.

10. The method of claim 7, wherein each of the plurality of resonant converters comprises a current sensor configured to monitor a series resonant inductor current of the resonant converter.

11. The method of claim 10, wherein switching of the resonant converter is controlled in response to a comparison of the series resonant inductor current and the common control reference voltage or current signal.

12. The method of claim 7, wherein input ports and output ports of the plurality of resonant converters are connected in parallel.

* * * * *